United States Patent
Raina et al.

(10) Patent No.: US 9,594,815 B2
(45) Date of Patent: Mar. 14, 2017

(54) LOCAL EXTREMA BASED DATA SAMPLING SYSTEM

(71) Applicant: SAS Institute Inc., Cary, NC (US)

(72) Inventors: Vineet Raina, Wakad (IN); Swapnil Daga, Ahmednagar (IN)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/957,826

(22) Filed: Dec. 3, 2015

(65) Prior Publication Data
US 2017/0004137 A1 Jan. 5, 2017

Related U.S. Application Data

(60) Provisional application No. 62/211,650, filed on Aug. 28, 2015.

(30) Foreign Application Priority Data

Jul. 3, 2015 (IN) .......................... 2026/DEL/2015

(51) Int. Cl.
*G06F 7/00* (2006.01)
*G06F 17/00* (2006.01)
*G06F 17/30* (2006.01)
*G06F 3/0484* (2013.01)

(52) U.S. Cl.
CPC ...... *G06F 17/3056* (2013.01); *G06F 3/04842* (2013.01); *G06F 17/30595* (2013.01)

(58) Field of Classification Search
CPC .................................................. G06F 3/04843
USPC ....................................................... 707/603
See application file for complete search history.

(56) References Cited

U.S. PATENT DOCUMENTS

| | | | |
|---|---|---|---|
| 6,188,403 B1* | 2/2001 | Sacerdoti .......... | G06F 17/30554 345/440 |
| 2004/0183800 A1* | 9/2004 | Peterson ............... | G06T 11/206 345/440 |
| 2007/0143688 A1* | 6/2007 | Cheng ................. | G06F 17/2229 715/738 |
| 2008/0022232 A1* | 1/2008 | McConaghy ....... | G06F 17/5022 716/102 |

(Continued)

OTHER PUBLICATIONS

Unit 48—Line Generalization, http://ibis.geog.ubc.ca/courses/klink/gis.notes/ncgia/u48.html, Aug. 30, 1997, pp. 1-7.

(Continued)

*Primary Examiner* — Van Oberly
(74) *Attorney, Agent, or Firm* — Bell & Manning, LLC

(57) ABSTRACT

A computing device sorts a plurality of data points in a first dimension. A first data point has a first value, a second data point has a second value, and a third data point has a third value defined in a second dimension. (a) The second value is compared to the first and third values. (b) When the second value is less than the first value and greater than the third value, or the second value is greater than the first value and less than the third value, the data point is deleted. (c) The first data point is defined as the second data point. (d) The second data point is defined as the third data point. (e) The third data point is defined as a next data point. (a)-(e) are repeated until each of the plurality of data points is defined as the third data point to define a plurality of sampled data points as remaining data points of the plurality of data points.

29 Claims, 14 Drawing Sheets

(56) References Cited

U.S. PATENT DOCUMENTS

2013/0030759 A1* 1/2013 Hao .................. G06F 17/18
                                                    702/179
2014/0052711 A1* 2/2014 Bamba ............. G06F 17/30241
                                                    707/718

OTHER PUBLICATIONS

S. Ekdemir, Efficient Implementation of Polyline Simplification for Large Datasets and Usability Evaluation, Sep. 2011, pp. 1-47.
Hershberger et al., Speeding Up the Douglas-Peucker Line-Simplification Algorithm, University of British Columbia, Department of Computer Science, 1992.
R. McMaster, The Geometric Properties of Numerical Generalization, Geographical Analysis vol. 19, No. 4, Oct. 1987, pp. 330-346.
Shi et al., Performance Evaluation of Line Simplification Algorithms for Vector Generalization, The Cartographic Journal vol. 43 No. 1, Mar. 2006, pp. 27-44.
Zhao et al., Linear-Time Sleeve-Fitting Polyline Simplification Algorithms, AutoCarto, Seattle, 1997.

* cited by examiner

LOCAL EXTREMA BASED DATA SAMPLING SYSTEM

CROSS-REFERENCE TO RELATED APPLICATIONS

The present application claims the benefit of 35 U.S.C. §119(e) to U.S. Provisional Patent Application No. 62/211,650, filed on Aug. 28, 2015, the entire contents of which are hereby incorporated by reference. The present application further claims the benefit of 35 U.S.C. §119(a) to Indian Provisional Patent Application No. 2026/DEL/2015, filed on Jul. 3, 2015, the entire contents of which are hereby incorporated by reference.

BACKGROUND

Computational processes are widely-used to analyze, understand, integrate, and transform data. Visualization techniques may be used to present the data for evaluation and analysis of the data. Today, more data is created every year than has existed in the past. With such an explosion in the amount of data and the emergence of big data, identification of new Visualization techniques suitable for such gigantic amounts of data has become very important.

SUMMARY

In an example embodiment, a computer-readable medium is provided having stored thereon computer-readable instructions that when executed by a computing device, cause the computing device to sample data. A plurality of data points is read from a dataset. Each data point of the plurality of data points is defined in a first dimension and a second dimension. The plurality of data points are sorted in the first dimension. A first data point is defined from the read plurality of data points. The first data point has a first value defined in the second dimension. A second data point is defined from the read plurality of data points. The second data point has a second value defined in the second dimension. A third data point is defined from the read plurality of paired data points. The third data point has a third value defined in the second dimension. (a) The second value defined in the second dimension is compared to the first value defined in the second dimension and to the third value defined in the second dimension. (b) When the second value defined in the second dimension is not greater than the first value defined in the second dimension or is not greater than the third value defined in the second dimension, and the second value defined in the second dimension is not less than the first value defined in the second dimension or is not less than the third value defined in the second dimension, the data point is deleted from the read plurality of paired data points. (c) The first data point is defined as the second data point. (d) The second data point is defined as the third data point. (e) The third data point is defined as a next data point from the read plurality of data points. (a)-(e) are repeated until each of the read plurality of data points is defined as the third data point to define a plurality of sampled data points as remaining data points of the read plurality of data points.

In another example embodiment, a system is provided. The system includes, but is not limited to, a processor and a computer-readable medium operably coupled to the processor. The computer-readable medium has instructions stored thereon that, when executed by the processor, cause the system to sample data.

In yet another example embodiment, a method of sampling data is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
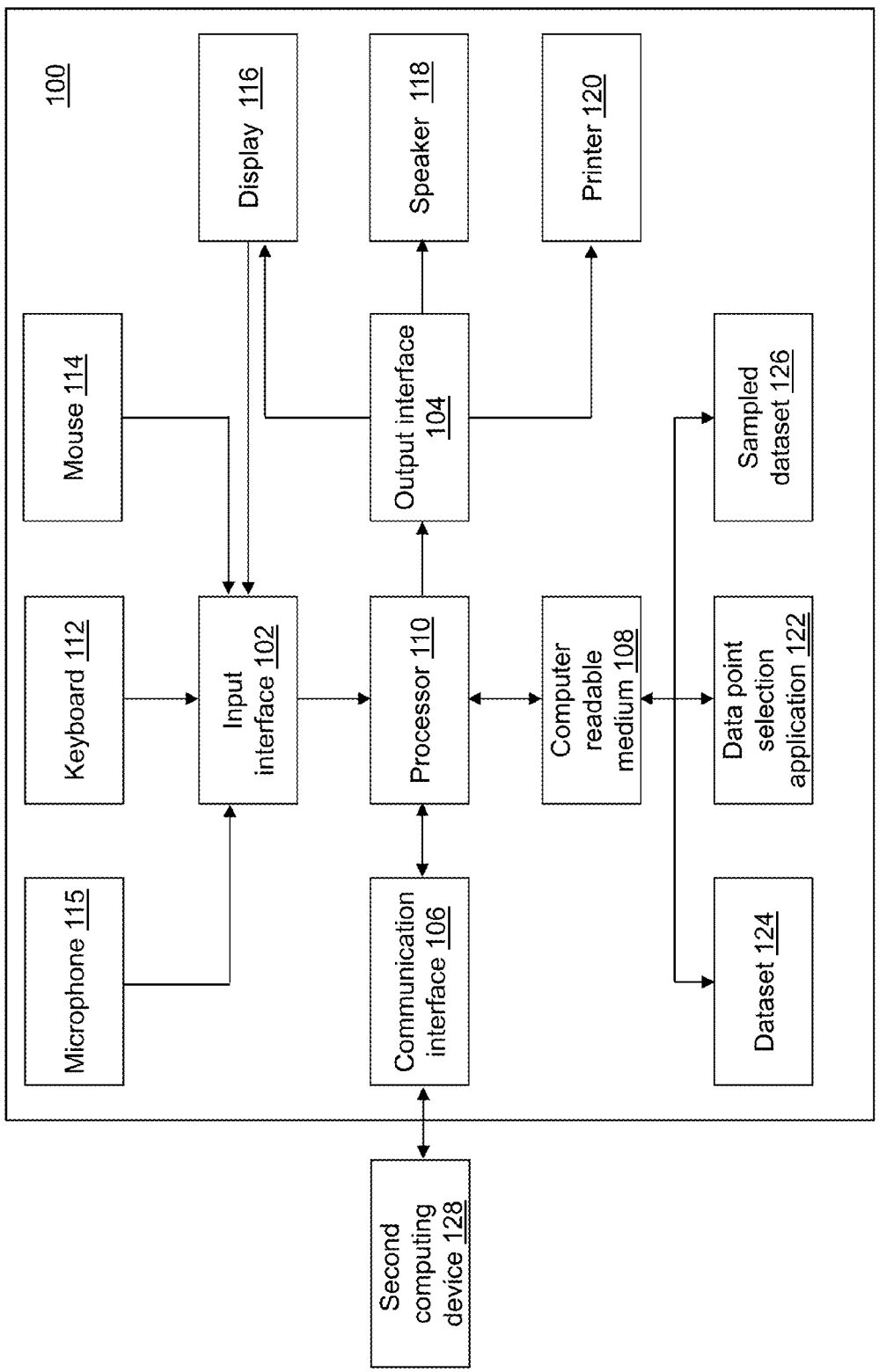
FIG. 1 depicts a block diagram of a data point selection device in accordance with an illustrative embodiment.

Referring to FIG. 1, a block diagram of a data point selection device 100 is shown in accordance with an illustrative embodiment. Data point selection device 100 may include an input interface 102, an output interface 104, a communication interface 106, a computer-readable medium 108, a processor 110, a data point selection application 122, a dataset 124, and a sampled dataset 126. Fewer, different, and/or additional components may be incorporated into data point selection device 100.

Input interface 102 provides an interface for receiving information from the user for entry into data point selection device 100 as understood by those skilled in the art. Input interface 102 may interface with various input technologies including, but not limited to, a keyboard 112, a mouse 114, a microphone 115, a display 116, a track ball, a keypad, one or more buttons, etc. to allow the user to enter information into data point selection device 100 or to make selections presented in a user interface displayed on the display. The same interface may support both input interface 102 and output interface 104. For example, display 116 comprising a touch screen provides user input and presents output to the user. Data point selection device 100 may have one or more input interfaces that use the same or a different input interface technology. The input interface technology further may be accessible by data point selection device 100 through communication interface 106.

Output interface 104 provides an interface for outputting information for review by a user of data point selection device 100 and/or for use by another application. For example, output interface 104 may interface with various output technologies including, but not limited to, display 116, a speaker 118, a printer 120, etc. Data point selection device 100 may have one or more output interfaces that use the same or a different output interface technology. The output interface technology further may be accessible by data point selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data point selection device 100 may have one or more communication interfaces that use the same or a different communication interface technology. For example, data point selection device 100 may support communication using an Ethernet port, a Bluetooth antenna, a telephone jack, a USB port, etc. Data and messages may be transferred between data point selection device 100 and a second computing device 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Data point selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data point selection device 100 also may have one or more drives that support the loading of a memory media such as a CD, DVD, an external hard drive, etc. One or more external hard drives further may be connected to data point selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data point selection device 100 may include a plurality of processors that use the same or a different processing technology.

Data point selection application 122 performs operations associated with selecting data points from dataset 124 to create sampled dataset 126. Some or all of the operations described herein may be embodied in data point selection application 122. Referring to the example embodiment of FIG. 1, data point selection application 122 is implemented in software (comprised of computer-readable and/or computer-executable instructions) stored in computer-readable medium 108 and accessible by processor 110 for execution of the instructions that embody the operations of data point selection application 122. Data point selection application 122 may be written using one or more programming languages, assembly languages, scripting languages, etc.

Data point selection application 122 may be implemented as a Web application. For example, data point selection application 122 may be configured to receive hypertext transport protocol (HTTP) requests and to send HTTP responses. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 124 may include a plurality of rows and a plurality of columns. The plurality of rows may be referred to as observations or records, and the columns may be referred to as variables that are associated with an observation. Values associated with any pair of variables for the same observation may be referred to as a data point. For example, each data point of a plurality of data points is defined in a first dimension for a first variable and in a second dimension for a second variable. The first dimension may be referenced as an x-dimension, and the second dimension may be referenced as a y-dimension. When a goal of sampling dataset 124 is to render a graph with the data points in sampled dataset 126, the x-dimension may define an x-coordinate, and the y-dimension may define a y-coordinate. Each data point represents a pair of values selected from two columns of the columns of dataset 124 for a single observation. Dataset 124 may be transposed.

Dataset 124 may be stored on computer-readable medium 108 or on another computer-readable medium of second computing device 128 and accessed by data point selection device 100 using communication interface 106. Data stored in dataset 124 may be a sensor measurement, a signal value, may be generated or captured in response to occurrence of an event or a transaction, generated by a device such as in response to an interaction by a user with the device, etc.

Thus, the data stored in dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Thus, the data stored in dataset 124 may be captured at different time points periodically, intermittently, when an event occurs, etc. One or more columns may include a time value.

Dataset 124 may be stored in various compressed formats such as a coordinate format, a compressed sparse column format, a compressed sparse row format, etc. Dataset 124 further may be stored using various structures as known to those skilled in the art including a file system, a relational database, a system of tables, a structured query language database, etc. on data point selection device 100 or on second computing device 128. Second computing device 128 may coordinate access to dataset 124 that is distributed across a plurality of computing devices. For example, dataset 124 may be stored in a cube distributed across a grid of computers as understood by a person of skill in the art. As another example, dataset 124 may be stored in a multi-node Hadoop® cluster. For instance, Apache™ Hadoop® is an open-source software framework for distributed computing supported by the Apache Software Foundation. As another example, dataset 124 may be stored in a cloud of computers and accessed using cloud computing technologies, as understood by a person of skill in the art. The SAS® LASR™ Analytic Server developed and provided by SAS Institute Inc. of Cary, N.C. may be used as an analytic platform to enable multiple users to concurrently access data stored in dataset 124.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Some data may be processed with an event stream processing engine (ESPE), which may reside in the cloud or in an edge device.

Figure 2A:
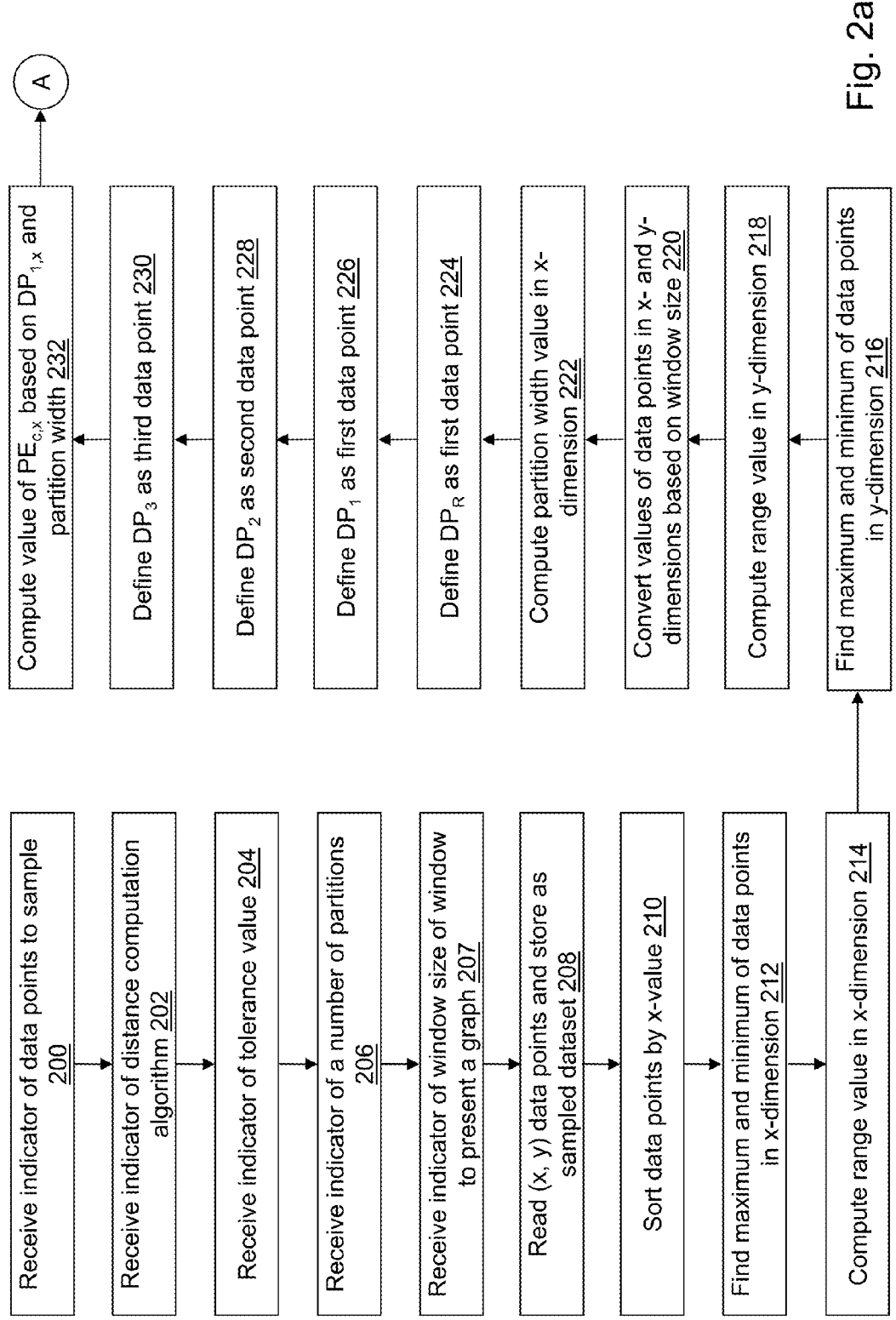
FIGS. 2a-2c depict flow diagrams illustrating examples of operations performed by a data point selection application of the data point selection device of FIG. 1 in accordance with an illustrative embodiment.
Figure 2B:
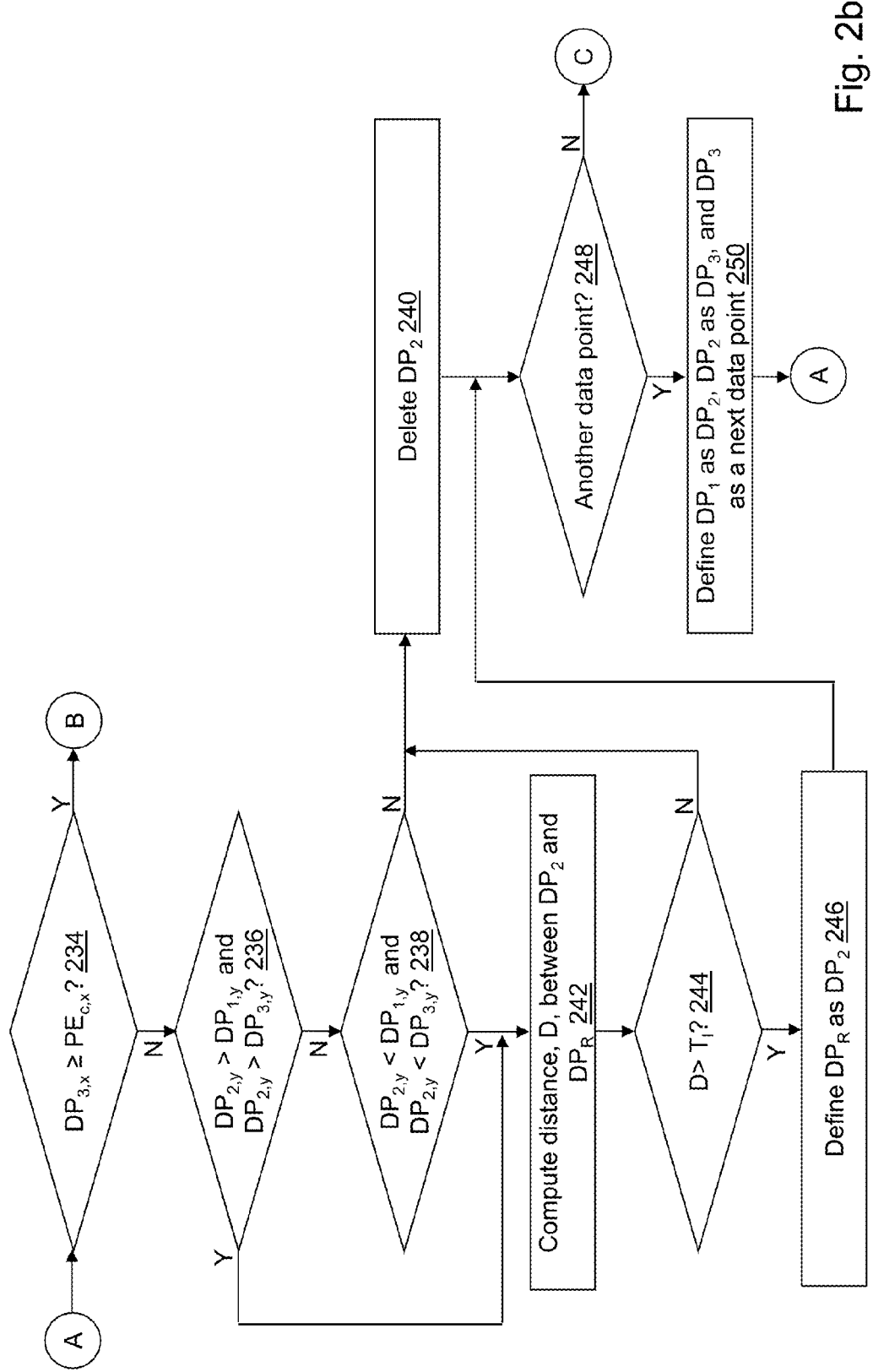
Figure 2C:
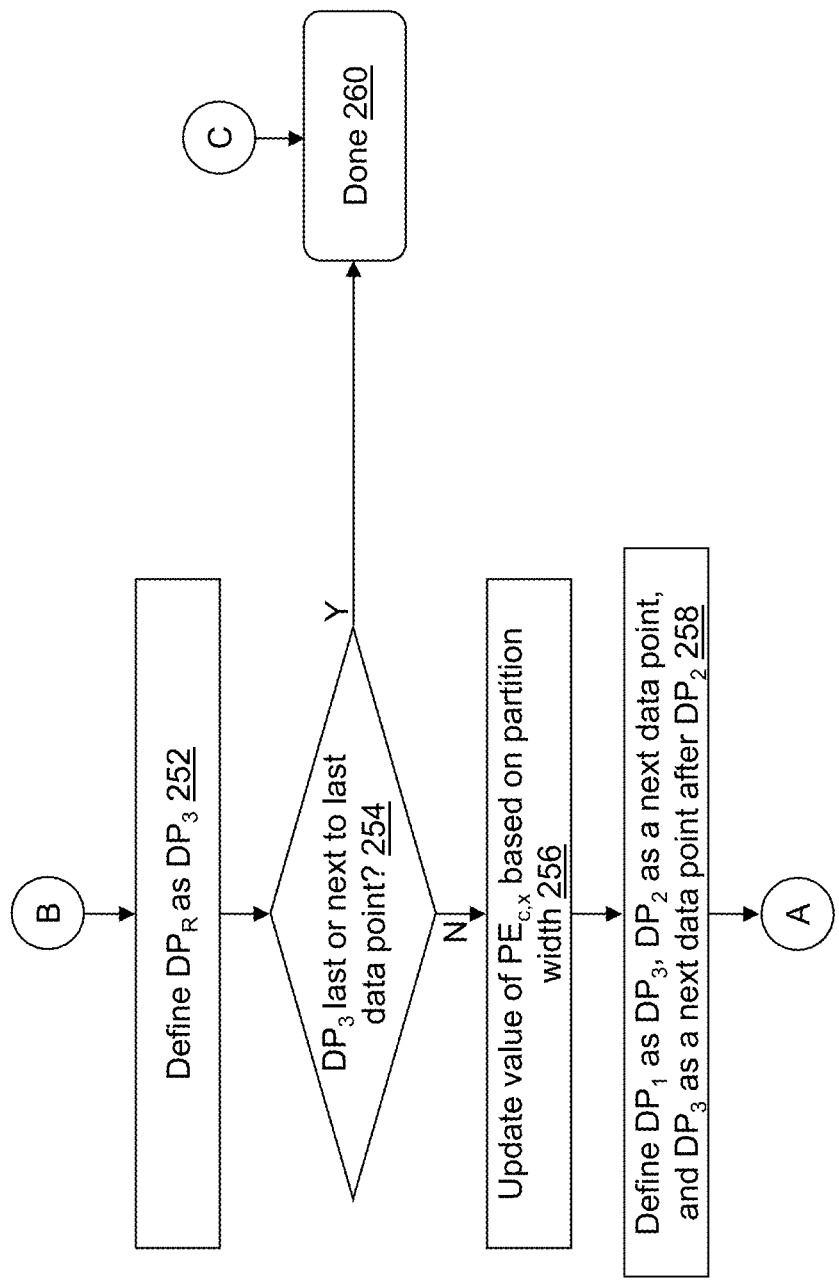

Referring to FIGS. 2a-2c, example operations associated with data point selection application 122 are described. The example operations may be used to generate sampled dataset 126. Additional, fewer, or different operations may be performed depending on the embodiment. The order of presentation of the operations of FIGS. 2a-2c is not intended to be limiting. Although some of the operational flows are presented in sequence, the various operations may be performed in various repetitions, concurrently (in parallel, for example, using threads), and/or in other orders than those that are illustrated. For example, as described above, a user may execute data point selection application 122, which causes presentation of a first user interface window, which may include a plurality of menus and selectors such as drop down menus, buttons, text boxes, hyperlinks, etc. associated with data point selection application 122 as understood by a person of skill in the art. An indicator may indicate one or more user selections from a user interface, one or more data entries into a data field of the user interface, one or more data items read from computer-readable medium 108 or otherwise defined with one or more default values, etc. that are received as an input by data point selection application 122.

Referring to FIG. 2a, in an operation 200, a first indicator is received that indicates all or a portion of dataset 124. For example, the first indicator indicates a location and a name of dataset 124. The first indicator may be received by data point selection application 122 after selection from a user interface window or after entry by a user into a user interface window. In an alternative embodiment, dataset 124 may not be selectable. For example, a default dataset or a most recently created dataset may be used automatically as dataset 124.

The first indicator may further indicate a first column (variable) to use to define the first (x-) dimension and a second column (variable) to use to define the second (y-) dimension. In an alternative embodiment, the first indicator may not be received. For example, a first and a second column may be used automatically.

The first indicator further may indicate a subset of observations to include in sampled dataset 126. For example, the first indicator may indicate a minimum sampled x-value and a maximum sampled x-value. Values read from dataset 124 that are less than the minimum sampled x-value or that are greater than the maximum sampled x- may be ignored. The first indicator may not be needed, for example, if default values are used or may be divided into a plurality of indicators that separately define the location of dataset 124, the name of dataset 124, the first (x-) dimension, the second (y-) dimension, the minimum sampled x-value, and/or the maximum sampled x-value.

In an operation 202, a second indicator of a distance computation algorithm is received. For example, the second indicator indicates a name of a distance computation algorithm. The second indicator may be received by data point selection application 122 after selection from a user interface window or after entry by a user into a user interface window. A default value for the distance computation algorithm may further be stored, for example, in computer-readable medium 108. As an example, a distance computation algorithm may be selected from "Euclidian distance", "X-Dimension distance", "Y-Dimension distance", "Perpendicular distance from a line", etc. As an example, a default distance computation algorithm may be the "Euclidian distance" distance computation algorithm. Of course, the distance computation method may be labeled or selected in a variety of different manners by the user as understood by a person of skill in the art. In an alternative embodiment, the distance computation algorithm may not be selectable, and a single distance computation algorithm is implemented by data point selection application 122.

In an operation 204, a third indicator is received that indicates a tolerance value $T_l$. $T_l$ defines a criteria for retaining or eliminating data points from dataset 124 based on a computed distance. The third indicator may be received by data point selection application 122 after a selection from a user interface window or after entry by a user into a user interface window, for example. In an alternative embodiment, the tolerance value may not be selectable. For example, a default value for the tolerance value may further be stored, for example, in computer-readable medium 108.

In an operation 206, a fourth indicator is received that indicates a number of partitions. The number of partitions is used to define a number of partitions into which dataset 124 is divided such that a first and a last or an only point within each partition is included in sampled dataset 126. The fourth indicator may be received by data point selection application 122 after a selection from a user interface window or after entry by a user into a user interface window, for example. In an alternative embodiment, the number of partitions may not be selectable. For example, a default value for the number of partitions may further be stored, for example, in computer-readable medium 108.

In an operation 207, a fifth indicator is received that indicates a window size in the x-dimension and in the y-dimension of a window within which a graph of sampled dataset 126 is presented. The fifth indicator may be received by data point selection application 122 after a selection from a user interface window or after entry by a user into a user interface window. In an alternative embodiment, the window size may be determined automatically based on a size of a user interface window created by data point selection application 122. As another example, a default value for the window size may further be stored, for example, in computer-readable medium 108.

In an operation 208, paired (x,y) data points are read from dataset 124 based on the defined first (x-) dimension and the defined second (y-) dimension stored in sampled dataset 126. For example, the data points may be read from a ROM type of computer-readable medium 108 and stored in a RAM type of computer-readable medium 108 in the form of a list of paired data points, an array of data points, a contiguous block of memory, etc. As discussed previously, the data points may be read from second computing device 128. For illustration, a copy of dataset 124 may be created as sampled dataset 126 and read from the ROM type of computer-readable medium 108 to the RAM type of computer-readable medium 108 for processing by data point selection application 122.

In an operation 210, the read data points are sorted by values in the first (x-) dimension if the values are not already sorted in the first (x-) dimension. For example, the first (x-) dimension values may be time values that are already time ordered. The direction of sorting from lowest to highest or from highest to lowest may depend on how the read data points are joined. In alternative embodiments, the first and second dimension may be swapped.

In an operation 212, a minimum x-value and a maximum x-value are determined for the (sorted) data points in the first (x-) dimension. In an alternative embodiment, the minimum x-value and the maximum x-value may be specified by a user as a range of values of interest instead of looking at the entire range of values determined.

In an operation 214, a first range value in the first (x-) dimension is computed as a difference between the maximum x-value and the minimum x-value.

In an operation 216, a minimum y-value and a maximum y-value are determined for the (sorted) data points in the second (y-) dimension.

In an operation 218, a second range value in the second (y-) dimension is computed as a difference between the maximum y-value and the minimum y-value.

In an operation 220, the read (sorted) data points are converted to values that fit within the window within which the graph is presented using $$Conv_x = (W/Range_x)*(Read_x - Min_x), \text{ and}$$

$$Conv_y = (H/Range_y)*(Read_y - Min_y)$$

where, W is the window size in the x-dimension, H is the window size in the y-dimension, $Range_x$ is the first range value, $Range_y$ is the second range value, $Read_x$ is the read x-value, $Read_y$ is the read y-value, $Min_x$ is the minimum x-value, $Min_y$ is the minimum y-value, $Conv_x$ is the converted x-value, and $Conv_y$ is the converted y-value. $Conv_x$ and $Conv_y$ are coordinate values.

In an operation 222, a partition width value is computed in the first (x-) dimension by dividing W by the number of partitions. In an alternative embodiment, instead of indicating the number of partitions, the partition width value may be indicated and received as an input value. In another alternative embodiment when operation 220 is performed after operation 254, the partition width value may be computed by dividing $Range_x$ by the number of partitions.

In an operation 224, a previous retained data point $DP_R$ is indicated as a first data point of the converted data points.

In an operation 226, a data point $DP_1$ is defined as the first data point of the converted data points.

In an operation 228, a data point $DP_2$ is defined as a second data point of the converted data points.

In an operation 230, a data point $DP_3$ is defined as a third data point of the converted data points.

In an operation 232, a current partition end value $PE_{c,x}$ is computed based on $DP_{1,x}$ and the computed (defined) partition width value. For example, the current partition end value $PE_{c,x}$ is the converted x-value of the first data point, $DP_{1,x}$, plus the computed (defined) partition width value.

Figure 3:
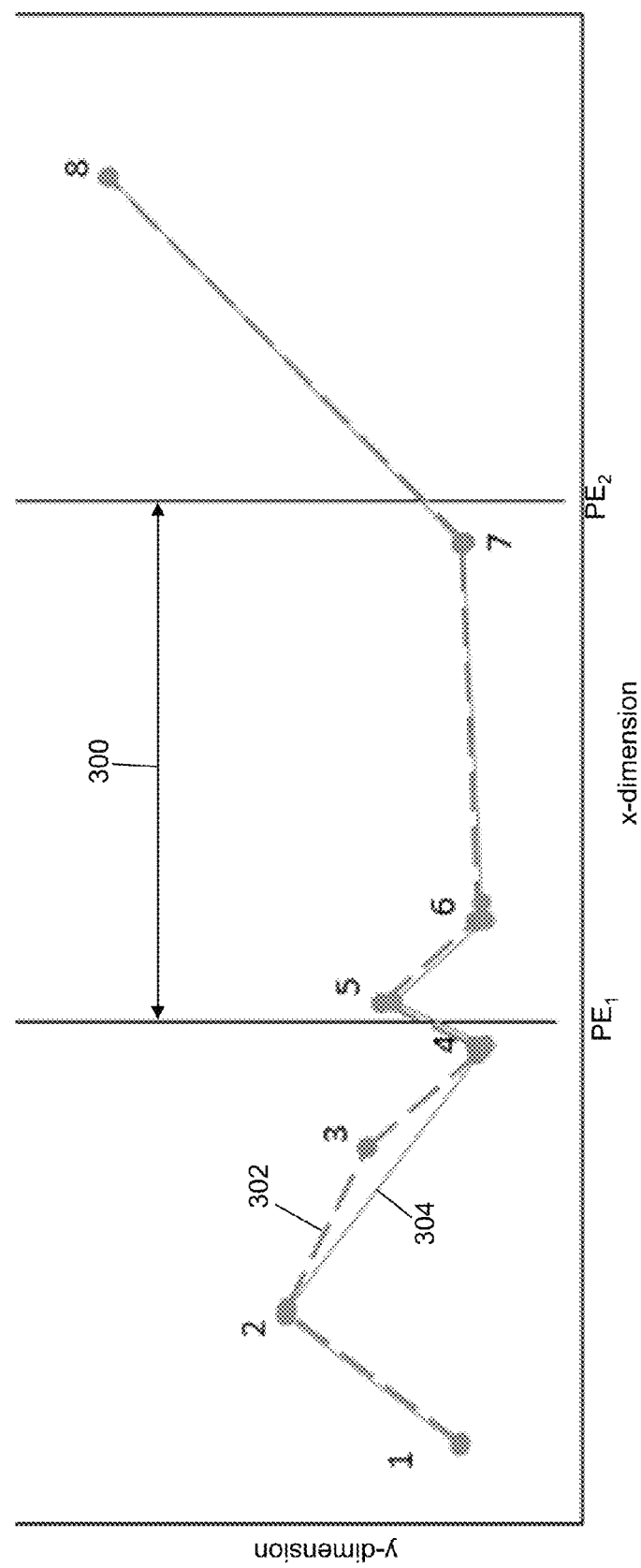
FIG. 3 illustrates a first sampled dataset sampled using the data point selection application of the data point selection device of FIG. 1 in accordance with illustrative embodiments.

For example, referring to FIG. 3, dataset 124 that includes eight points labeled 1-8 is shown by a first line 302 defined by polylines that connect successive data points in accordance with an illustrative embodiment. A first sampled dataset sampled using data point selection application 122 of data point selection device 100 is shown by a second line 304 defined by polylines that connect successive data points in accordance with the illustrative embodiment. Dataset 124 includes eight points labeled 1-8, and sampled dataset 126 includes seven points labeled 1, 2, 4, 5, 6, 7, and 8. The number of partitions was set to three resulting in a first partition end value $PE_{1,x}$ and a second partition end value $PE_{2,x}$ separated by a partition width value 300. Data points 1, 4, 5, 7, and 8 are retained in sampled dataset 126 because each data point is either a first or a last data point of a respective partition.

Referring to FIG. 2b, processing continues in an operation 234. In operation 234, a determination is made concerning whether or not $DP_2$ is a last data point of the partition as indicated by comparing the converted x-value of the third data point, $DP_{3,x}$, to $PE_{c,x}$, which was initialized to $PE_{1,x}$. If $DP_{3,x}$ is greater than or equal to $PE_{c,x}$, $DP_2$ is the last data point of the current partition, and $DP_3$ is a first data point of a next partition. If $DP_{3,x}$ is greater than or equal to $PE_{c,x}$, processing continues in an operation 252 shown referring to FIG. 2c. If $DP_{3,x}$ is less than $PE_{c,x}$, processing continues in an operation 236.

In operation 236, a determination is made concerning whether or not $DP_2$ is a local peak as indicated by comparing the converted y-value of the second data point, $DP_{2,y}$, to the converted y-value of the first data point, $DP_{1,y}$ and to the converted y-value of the third data point, $DP_{3,y}$. When $DP_{2,y} > DP_{1,y}$ and $DP_{2,y} > DP_{3,y}$, $DP_2$ is a local peak. If $DP_2$ is a local peak, processing continues in an operation 242. If $DP_2$ is not a local peak, processing continues in an operation 238.

In operation 238, a determination is made concerning whether or not $DP_2$ is a local trough as indicated by comparing the converted y-value of the second data point, $DP_{2,y}$, to the converted y-value of the first data point, $DP_{1,y}$ and to the converted y-value of the third data point, $DP_{3,y}$. When $DP_{2,y} < DP_{1,y}$ and $DP_{2,y} < DP_{3,y}$, $DP_2$ is a local trough. If $DP_2$ is a local trough, processing continues in operation

242. If $DP_2$ is not a local trough, processing continues in an operation 240. Local peaks and local troughs may also be referred to as critical points or relative extrema or local extrema.

In operation 240, data point $DP_2$ is deleted from sampled dataset 126 because it is not a first or a last point in the partition, and it is not a local peak or a local trough, and processing continues in an operation 248.

In operation 242, a distance D is computed between data point $DP_2$ and $DP_R$. The distance is computed using the converted x-value of the second data point, $DP_{2,x}$, the converted y-value of the second data point, $DP_{2,y}$, the converted x-value of $DP_R$, $DP_{R,x}$, and the converted y-value of $DP_R$, $DP_{R,y}$ with the distance computation algorithm indicated by the fifth indicator. For example, if "Euclidian distance" is indicated, the distance is computed as D= $\sqrt{(x_2-x_1)^2+(y_2-y_1)^2}$ where $x_2$ is $DP_{2,x}$, $x_1$ is $DP_{R,x}$, $y_2$ is $DP_{2,y}$, and $y_1$ is $DP_{R,y}$. As another example, if "X-Dimension distance" is indicated, the distance is computed as $x_2-x_1$. As yet another example, if "Y-Dimension distance" is indicated, the distance is computed as $y_2-y_1$. As still another example, if "Perpendicular Distance from a Line" is indicated, the distance is computed as a perpendicular distance of $DP_2$ to a line joining $DP_R$ and $DP_3$. Other distance computation algorithms may be used.

In an operation 244, a determination is made concerning whether or not the computed distance, D, is greater than $T_l$. If $D>T_l$, processing continues in an operation 246. If $D \le T_l$, processing continues in operation 240 to delete data point $DP_2$ from sampled dataset 126 because it is not a sufficient distance from the last data point that was retained in (not deleted from) sampled dataset 126, and processing continues in operation 248.

Figure 4:
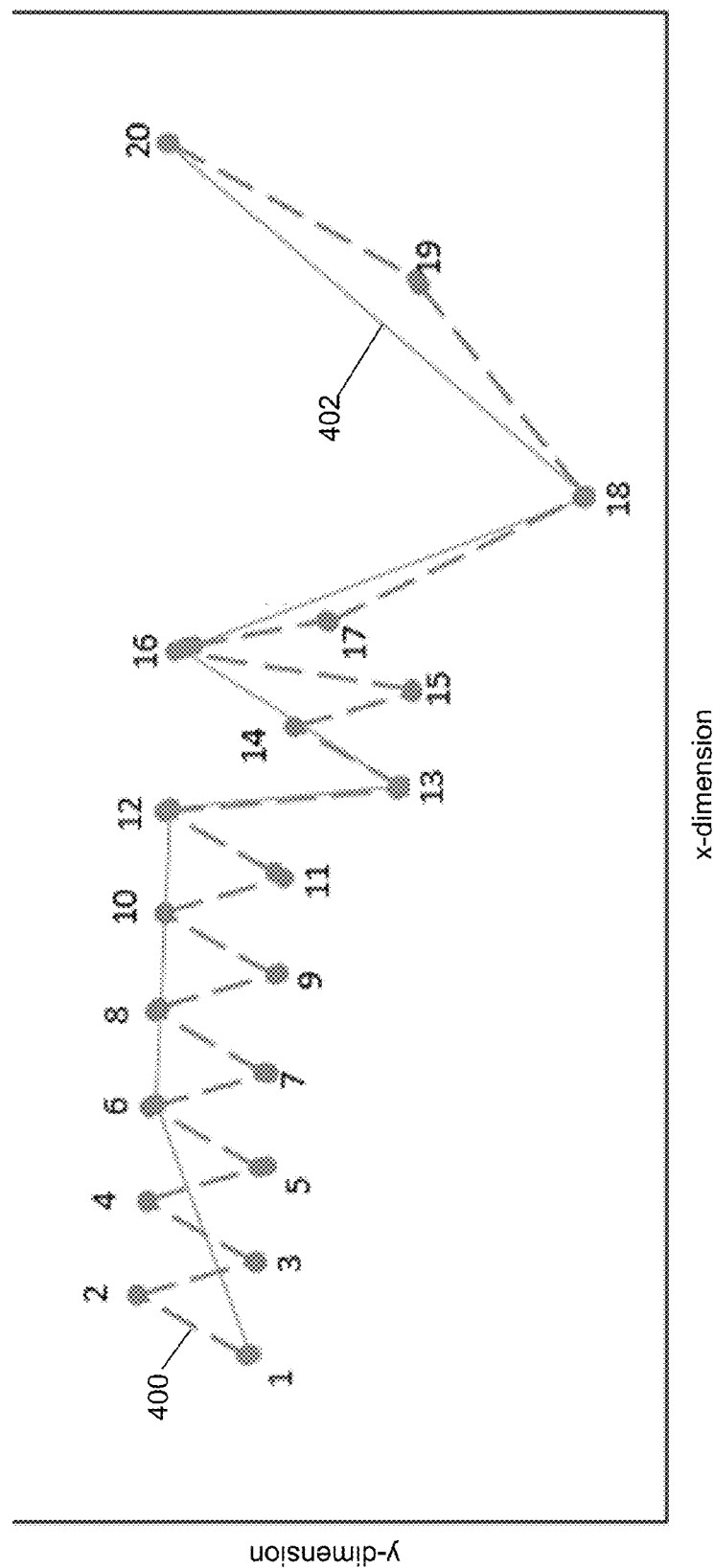
FIG. 4 illustrates a second sampled dataset sampled using the data point selection application of the data point selection device of FIG. 1 in accordance with illustrative embodiments.

For example, referring to FIG. 4, a second sampled dataset sampled using data point selection application 122 of data point selection device 100 is shown in accordance with an illustrative embodiment. Dataset 124, shown by a first line 400 defined by polylines that connect successive data points, includes twenty points labeled 1-20, and sampled dataset 126, shown by a second line 402 defined by polylines that connect successive data points, includes seven points labeled 1, 6, 12, 13, 16, 18, and 20. Data points 6, 12, 13, 16, 18 are retained in sampled dataset 126 because each data point is $D>T_l$ from the previous retained data point.

Referring again to FIG. 2b, in operation 246, $DP_R$ is defined as data point $DP_2$ because $DP_2$ is retained in sampled dataset 126, and processing continues in operation 248.

In operation 248, a determination is made concerning whether or not $DP_3$ is the last data point in sampled dataset 126 or there is another data point in sampled dataset 126. If there is another data point, processing continues in an operation 250. If there is not another data point, processing continues in an operation 260 shown referring to FIG. 2c.

In operation 250, $DP_1$ is defined as $DP_2$, $DP_2$ is defined as $DP_3$, and $DP_3$ is defined as a next data point in sampled dataset 126. Processing continues in operation 234 to determine if the new $DP_2$ should be retained or deleted.

Referring to FIG. 2c, in operation 252, $DP_R$ is defined as $DP_3$ because both $DP_2$ and $DP_3$ are retained in sampled dataset 126 because $DP_2$ is the last data point in the current partition, and $DP_3$ is the first data point in the next partition.

In operation 254, a determination is made concerning whether or not $DP_3$ is the last or the next to last data point in sampled dataset 126. If $DP_3$ is the last or the next to last data point, processing continues in operation 260. If $DP_3$ is not the last or the next to last data point, processing continues in an operation 256.

In operation 256, the current partition end value $PE_{c,x}$ is updated by adding the computed (defined) partition width value to the current partition end value.

In an operation 258, $DP_1$ is defined as $DP_3$, $DP_2$ is defined as a next data point in sampled dataset 126, and $DP_3$ is defined as a next data point after $DP_2$. $DP_1$, $DP_2$, and $DP_3$ are defined as two new data points because both $DP_2$ and $DP_3$ were retained. Processing continues in operation 234 to determine if $DP_2$ should be retained or deleted.

In operation 260, processing of sampled dataset 126 is done. The plurality of sampled data points included in sampled dataset 126 includes the data points read from dataset 124 that were not deleted in operation 240.

In an illustrative embodiment, first and last data points included in dataset 124 are included in sampled dataset 126, which is why the first $DP_1$ and the final $DP_3$ or the last data point are not evaluated for deletion.

As stated previously, the order of presentation of the operations of FIGS. 2a-2c is not intended to be limiting. Various operations can be performed in a different order than that illustrated in FIGS. 2a-2c. For illustration, operations 216-220 can be performed just before operation 260 so that the conversion values are computed for the remaining data points read from dataset 124 rather than all of the data points read from dataset 124. As another illustration, the conversion values may not be computed. For example, the sampled dataset 126 may be used for other types of signal or data processing that is not associated with a user interface window size.

Data point selection application 122 may be summarized as sampling a dataset and retaining peak or trough data points that are separated by a minimum distance and retaining the first and last data points overall as well as the first and last data points within a plurality of equal sized partitions defined in the first dimension. In alternative embodiments, data point selection application 122 may retain all of the peak and trough data points so that a minimum distance is not evaluated. In alternative embodiments, data point selection application 122 may not use partitioning to retain data points.

Figure 5:
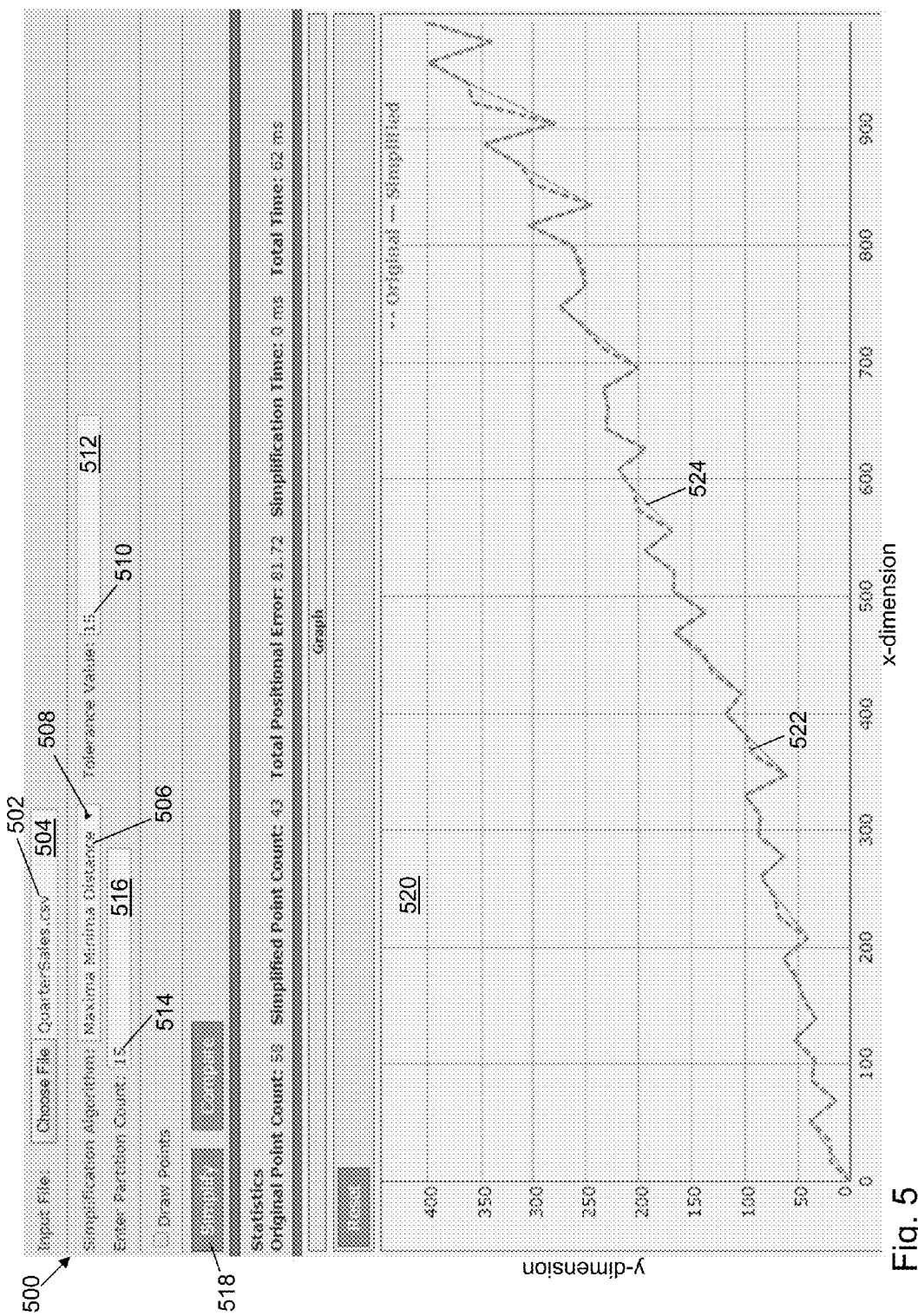
FIG. 5 illustrates a user interface window presented under control of the data point selection application of the data point selection device of FIG. 1 in accordance with illustrative embodiments.

Referring to FIG. 5, a user interface window 500 presented under control of data point selection application 122, for example, using display 116 of data point selection device 100 is shown. User interface window 500 may include a first indicator 502 in a first text box 504, a second indicator 506 in a drop down box 508, a third indicator 510 in a second text box 512, a fourth indicator 514 in a third text box 516, a "Simplify" button 518, and a graph window 520. First indicator 502 indicates dataset 124. Third indicator 510 indicates tolerance value $T_l$. When the tolerance value $T_l$ is defined as zero, a distance computation is not used. Fourth indicator 514 indicates the number of partitions. When the number of partitions is defined as one, partitioning is not used.

Second indicator 506 indicates a form of simplification algorithm selection. Of course, other options may be included in drop down box 508.

"Simplify" button 518 triggers execution of operations 200-260 with the indicated selections. The window size in the x-dimension and in the y-dimension of graph window 520 may also be used as part of the execution of operations 200-260. The data points in dataset 124 are shown by a first line 522 defined by polylines that connect successive data points from dataset 124. The data points in sampled dataset 126 are shown by a second line 524 defined by polylines that connect successive data points from sampled dataset 126. Sampled dataset 126 includes 41 of the original 60 data points included in dataset 124 resulting in a total positional error between first line 522 and second line 524 of 102.42.

Figure 6:
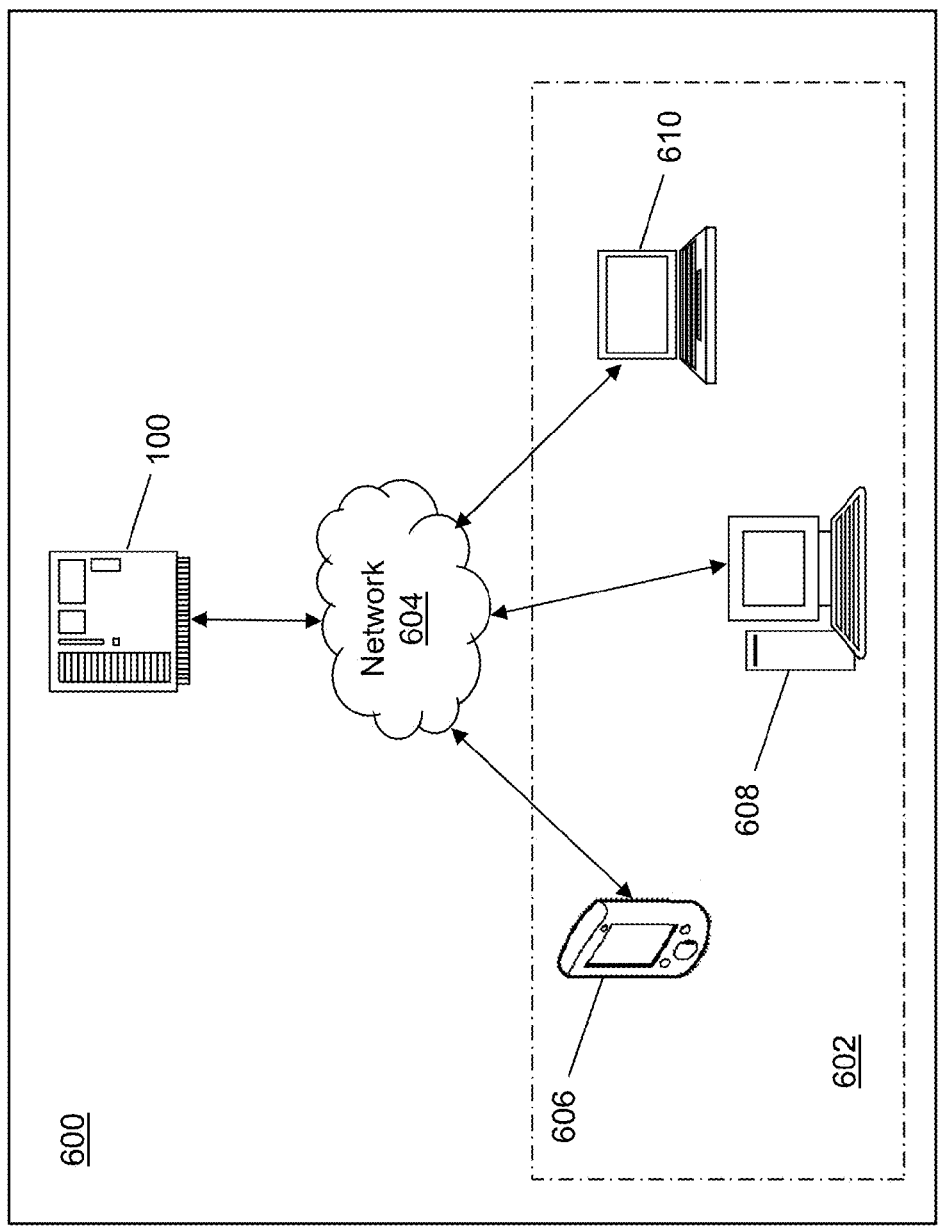
FIG. 6 depicts a block diagram of a distributed processing system in accordance with an illustrative embodiment.

Referring to FIG. 6, a block diagram of a distributed processing system 600 is shown in accordance with an illustrative embodiment. In an illustrative embodiment, distributed processing system 600 may include a graph rendering system 602, data point selection device 100, and a network 604. Though not shown, distributed processing system 600 further may include the plurality of computing devices that may store dataset 124 and to which second computing device 128 may coordinate access. One or more components of distributed processing system 600 may support multithreading as understood by a person of skill in the art. The components of distributed processing system 600 may be located in a single room or adjacent rooms, in a single facility, and/or may be distributed geographically from one another.

Network 604 may include one or more networks of the same or different types. Network 604 can be any type of wired and/or wireless public or private network including a cellular network, a local area network, a wide area network such as the Internet, etc. Network 604 further may comprise sub-networks and consist of any number of devices.

Graph rendering system 602 can include any number and type of computing devices that may be organized into subnets. The computing devices of graph rendering system 602 send and receive communications through network 604 to/from another of the one or more computing devices of graph rendering system 602 to/from data point selection device 100. The one or more computing devices of graph rendering system 602 may include computers of any form factor such as a smart phone 606, a desktop 608, a laptop 610, a personal digital assistant, an integrated messaging device, a tablet computer, etc. The one or more computing devices of graph rendering system 602 may communicate using various transmission media that may be wired and/or wireless as understood by those skilled in the art.

For illustration, FIG. 6 represents data point selection device 100 as a server computer though data point selection device 100 can include any form factor of computing device. In general, a server computer may include faster processors, additional processors, more disk memory, and more random access memory (RAM) than a client computer and support multi-threading as understood by a person of skill in the art.

Figure 7:
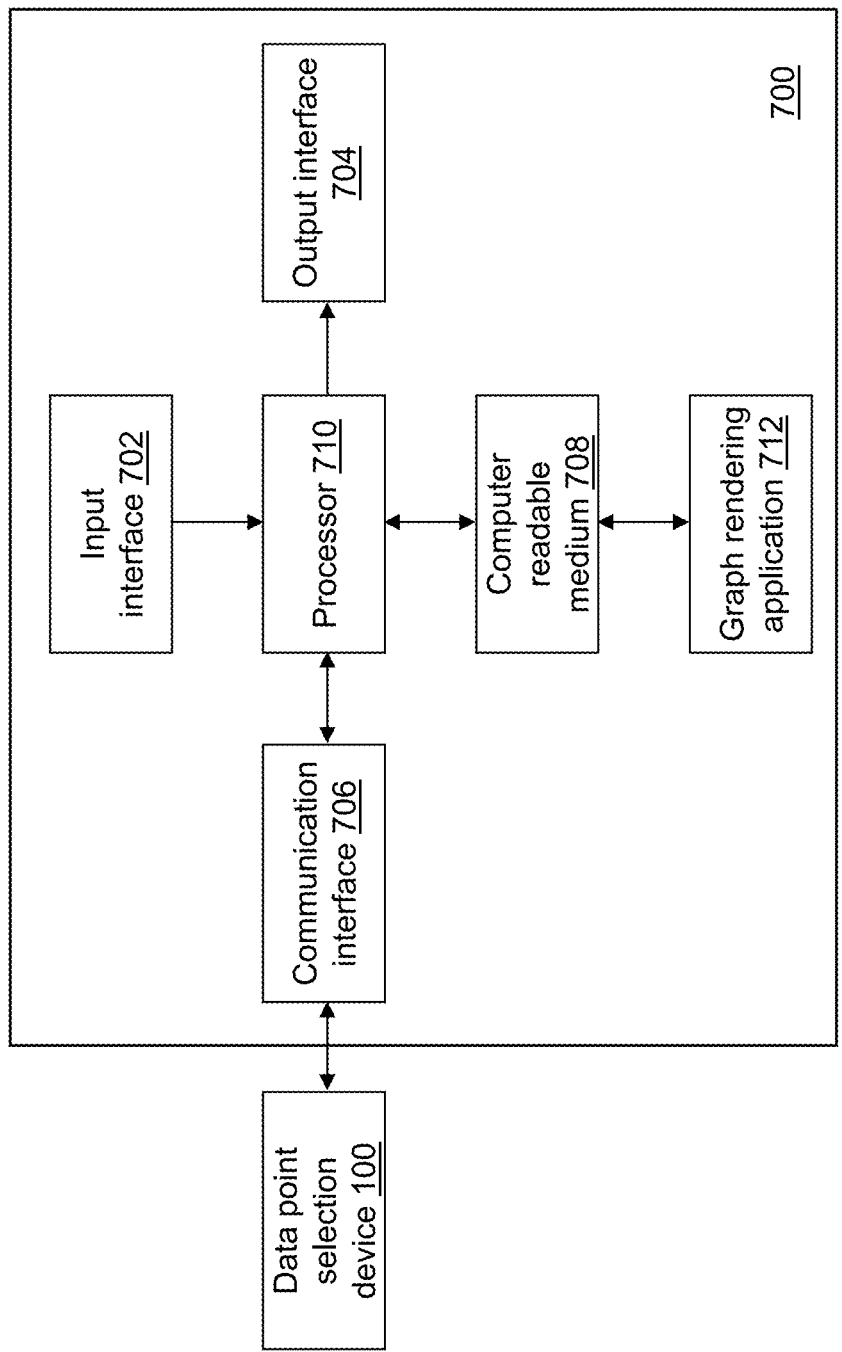
FIG. 7 depicts a block diagram of a graph rendering device in accordance with an illustrative embodiment.

Referring to FIG. 7, a block diagram of a graph rendering device 700 is shown in accordance with an example embodiment. Graph rendering device 700 is an example computing device of graph rendering system 602. Graph rendering device 700 may include a second input interface 702, a second output interface 704, a second communication interface 706, a second computer-readable medium 708, a second processor 710, and a graph rendering application 712. Fewer, different, and additional components may be incorporated into graph rendering device 700. Graph rendering device 700 and data point selection device 100 may be different devices or the same device.

Second input interface 702 provides the same or similar functionality as that described with reference to input interface 102 of data point selection device 100 though referring to graph rendering device 700. Second output interface 704 provides the same or similar functionality as that described with reference to output interface 104 of data point selection device 100 though referring to graph rendering device 700. Second communication interface 706 provides the same or similar functionality as that described with reference to communication interface 106 of data point selection device 100 though referring to graph rendering device 700. Data and messages may be transferred between graph rendering device 700 and data point selection device 100 using second communication interface 706. Second computer-readable medium 708 provides the same or similar functionality as that described with reference to computer-readable medium 108 of data point selection device 100 though referring to graph rendering device 700. Second processor 710 provides the same or similar functionality as that described with reference to processor 110 of data point selection device 100 though referring to graph rendering device 700.

Graph rendering application 712 performs computer operations associated with rendering a graph with data from sampled dataset 126 created by data point selection application 122. For example, graph rendering device 700 may receive sampled dataset 126 from data point selection device 100. Some or all of the operations described herein may be embodied in graph rendering application 712. Referring to the example embodiment of FIG. 7, graph rendering application 712 is implemented in software (comprised of computer-readable and/or computer-executable instructions) stored in second computer-readable medium 708 and accessible by second processor 710 for execution of the instructions that embody the operations of graph rendering application 712. Graph rendering application 712 may be written using one or more programming languages, assembly languages, scripting languages, etc. Graph rendering application 712 may be implemented as a Web application. For illustration, graph rendering application 712 may be included in the SAS® Visual Analytics suite of products developed and provided by SAS Institute Inc. of Cary, N.C., USA.

Figure 8:
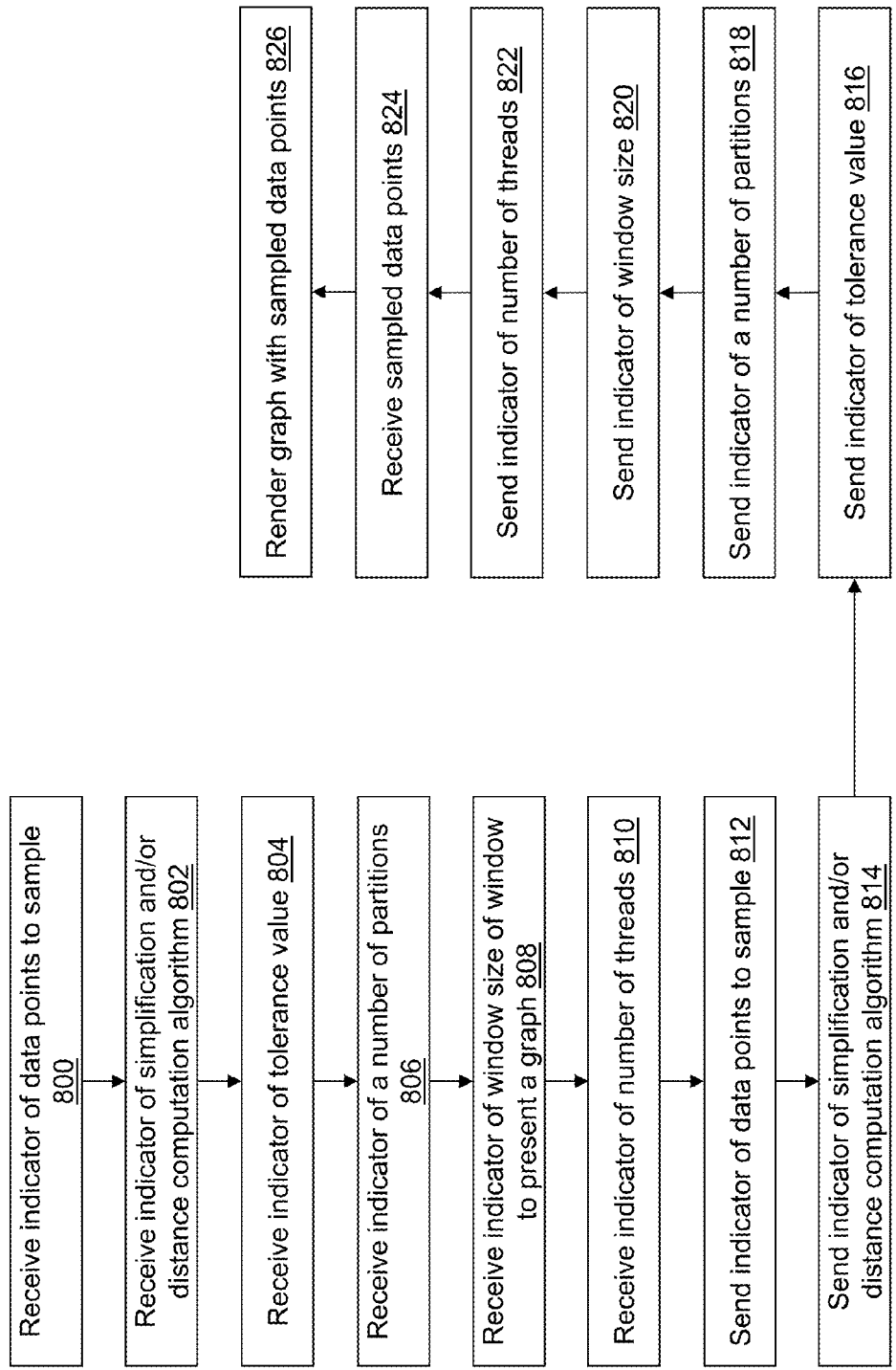
FIG. 8 depicts a flow diagram illustrating examples of operations performed by a graph rendering application of the graph rendering device of FIG. 7 in accordance with an illustrative embodiment.

Referring to FIG. 8, example operations associated with graph rendering application 712 are described. The example operations may be used to generate sampled dataset 126. Additional, fewer, or different operations may be performed depending on the embodiment. The order of presentation of the operations of FIG. 8 is not intended to be limiting. Although some of the operational flows are presented in sequence, the various operations may be performed in various repetitions, concurrently (in parallel, for example, using threads), and/or in other orders than those that are illustrated. For example, as described above, a user may execute graph rendering application 712, which causes presentation of a first user interface window such as user interface window 500 shown referring to FIG. 5, which may include a plurality of menus and selectors such as drop down menus, buttons, text boxes, hyperlinks, etc. associated with graph rendering application 712 as understood by a person of skill in the art. An indicator may indicate one or more user selections from a user interface, one or more data entries into a data field of the user interface, one or more data items read from second computer-readable medium 708 or otherwise defined with one or more default values, etc. that are received as an input by graph rendering application 712.

Similar to operation 200, in an operation 800, a first indicator is received that indicates all or a portion of dataset 124. For example, first indicator 502 is received.

Similar to operation 202, in an operation 802, a second indicator of a simplification and/or distance computation algorithm is received. For example, second indicator 506 is received.

Similar to operation 204, in an operation 804, a third indicator is received that indicates tolerance value $T_l$. For example, third indicator 510 is received.

Similar to operation 206, in an operation 806, a fourth indicator is received that indicates the number of partitions. For example, fourth indicator 514 is received.

Similar to operation 207, in an operation 808, a fifth indicator is received that indicates the window size in the x-dimension and in the y-dimension of the window within which the graph of sampled dataset 126 is presented. For example, x- and y-dimensions that define a number of pixels of graph window 520 in each direction are received. The number of pixels in each dimension may be computed automatically or otherwise known by graph rendering application 712 that controlled presentation of user interface window 500.

In an operation 810, a sixth indicator is received that indicates a number of threads created to perform some or all of the operations of data point selection application 122 simultaneously. For example, the sixth indicator may be received by graph rendering application 712 after a selection from a user interface window or after entry by a user into a user interface window. In an alternative embodiment, the number of threads may not be selectable. For example, a default value for the number of threads may further be stored, for example, in computer-readable medium 108 and/or may be related to a number of processors of data point selection device 100.

In an operation 812, the first indicator or a modification of the first indicator is sent to data point selection device 100.

In an operation 814, the second indicator or a modification of the second indicator is sent to data point selection device 100.

In an operation 816, the third indicator or a modification of the third indicator is sent to data point selection device 100.

In an operation 818, the fourth indicator or a modification of the fourth indicator is sent to data point selection device 100.

In an operation 820, the fifth indicator or a modification of the fifth indicator is sent to data point selection device 100.

In an operation 822, the sixth indicator or a modification of the sixth indicator is sent to data point selection device 100.

The first through sixth indicators may be sent in one or more messages to data point selection device 100. One or more of the first through sixth indicators may not be sent to data point selection device 100. For example, default values may be used by data point selection device 100.

In an operation 824, sampled dataset 126 that includes the sampled data points is received.

In an operation 826, the sampled data points are rendered in a graph. For example, second line 524 may be drawn in graph window 520. In alternative embodiments, an application receiving the sampled data points may perform data or signal processing on the sampled data points instead of rendering the graph.

Figure 9:
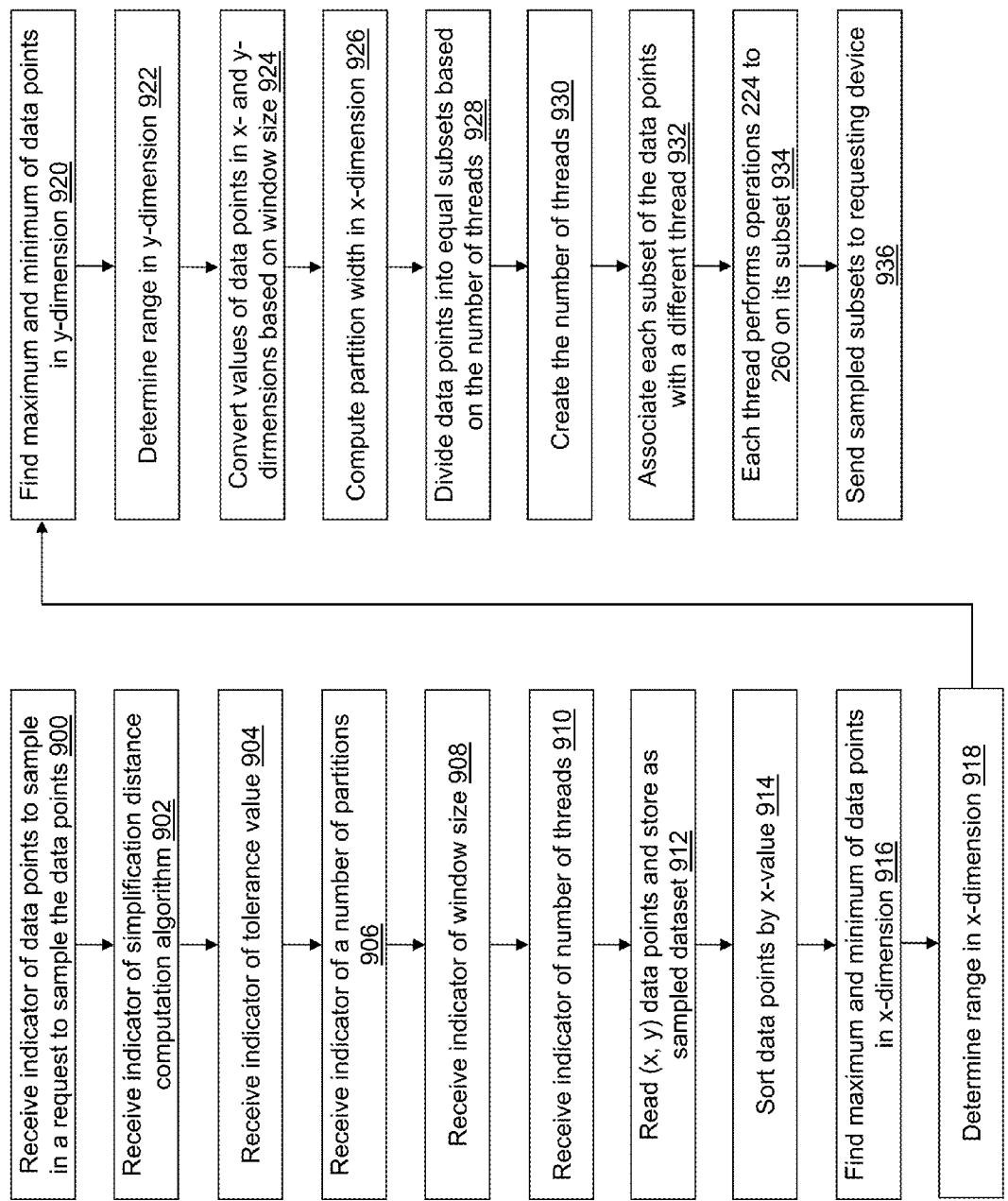
FIG. 9 depicts a flow diagram illustrating examples of operations performed by the data point selection application of a multi-threaded, data point selection device of FIG. 1 in accordance with an illustrative embodiment.

Referring to FIG. 9, example operations associated with data point selection application 122 are described that are similar to the operations described with reference to FIGS. 2a-2c except that a plurality of threads are used to perform a subset of the operations in parallel.

Similar to operation 200, in an operation 900, a first indicator is received that indicates all or a portion of dataset 124. For example, first indicator 502 is received from graph rendering application 712 executing at graph rendering device 700. Instead of receiving the first indicator from graph rendering application 712, data point selection application 122 may determine dataset 124 as a default value.

Similar to operation 202, in an operation 902, a second indicator of the simplification and/or distance computation algorithm is received. For example, second indicator 506 is received from graph rendering application 712 executing at graph rendering device 700. Instead of receiving the second indicator from graph rendering application 712, data point selection application 122 may determine the simplification and/or distance computation algorithm as a default value.

Similar to operation 204, in an operation 904, a third indicator is received that indicates the tolerance value, $T_l$. For example, third indicator 510 is received from graph rendering application 712 executing at graph rendering device 700. Instead of receiving the third indicator from graph rendering application 712, data point selection application 122 may determine $T_l$ as a default value.

Similar to operation 206, in an operation 906, a fourth indicator is received that indicates the number of partitions. For example, fourth indicator 514 is received from graph rendering application 712 executing at graph rendering device 700. Instead of receiving the fourth indicator from graph rendering application 712, data point selection application 122 may determine the number of partitions as a default value.

Similar to operation 207, in an operation 908, a fifth indicator is received that indicates the window size in the x-dimension and in the y-dimension. Instead of receiving the fifth indicator from graph rendering application 712, data point selection application 122 may determine the window size dimensions as a default value.

Similar to operation 810, in an operation 910, a sixth indicator is received that indicates the number of threads created to perform some or all of the operations of data point selection application 122 simultaneously. Instead of receiving the sixth indicator from graph rendering application 712, data point selection application 122 may determine the number of threads as a default value.

Similar to operation 208, in an operation 912, paired (x,y) data points are read from dataset 124.

Similar to operation 210, in an operation 914, the read data points are sorted by values in the first (x-) dimension if the values are not already sorted in the first (x-) dimension.

Similar to operation 212, in an operation 916, the minimum x-value and a maximum x-value are determined for the (sorted) data points in the first (x-) dimension.

Similar to operation 214, in an operation 918, the first range value in the first (x-) dimension is computed as difference between the maximum x-value and the minimum x-value.

Similar to operation 216, in an operation 920, the minimum y-value and a maximum y-value are determined for the (sorted) data points in the second (y-) dimension.

Similar to operation 218, in an operation 922, the second range value in the second (y-) dimension is computed as difference between the maximum y-value and the minimum y-value.

Similar to operation 220, in an operation 924, the read (sorted) data points are converted to values that fit within the window within which the graph is presented.

Similar to operation 222, in an operation 926, the partition width value is computed in the first (x-) dimension.

In an operation 928, the read (sorted) data points are divided into approximately equal sized subsets of data points. For example, a subset size is computed as a total number of data points divided by the number of threads rounded up to a next integer value. Of course, the total number of data points may not be equally divisible by the number of threads so one or more of the subsets may include one less data point. For example, with the total number of data points equal to 434 and with four threads, 109 data points are included in a first subset, 109 data points are included in a second subset, 108 data points are included in a third subset, and 108 data points are included in a fourth subset.

In an operation 930, the number of threads are created.

In an operation 932, each subset of the data points is associated with a different created thread. For example, the first subset may be associated with a first thread; the second subset may be associated with a second thread; the third subset may be associated with a third thread; and the fourth subset may be associated with a fourth thread. Associating may include sending the respective subset to the thread for processing, sending a pointer to a block of memory storing the respective subset to the thread for processing, etc.

In an operation 934, each created thread performs operations 224 to 260 on the subset of the data points associated with the respective created thread.

In an operation 936, the sampled subsets defined by each thread are sent to the requesting device such as graph rendering device 700.

Figure 10A:
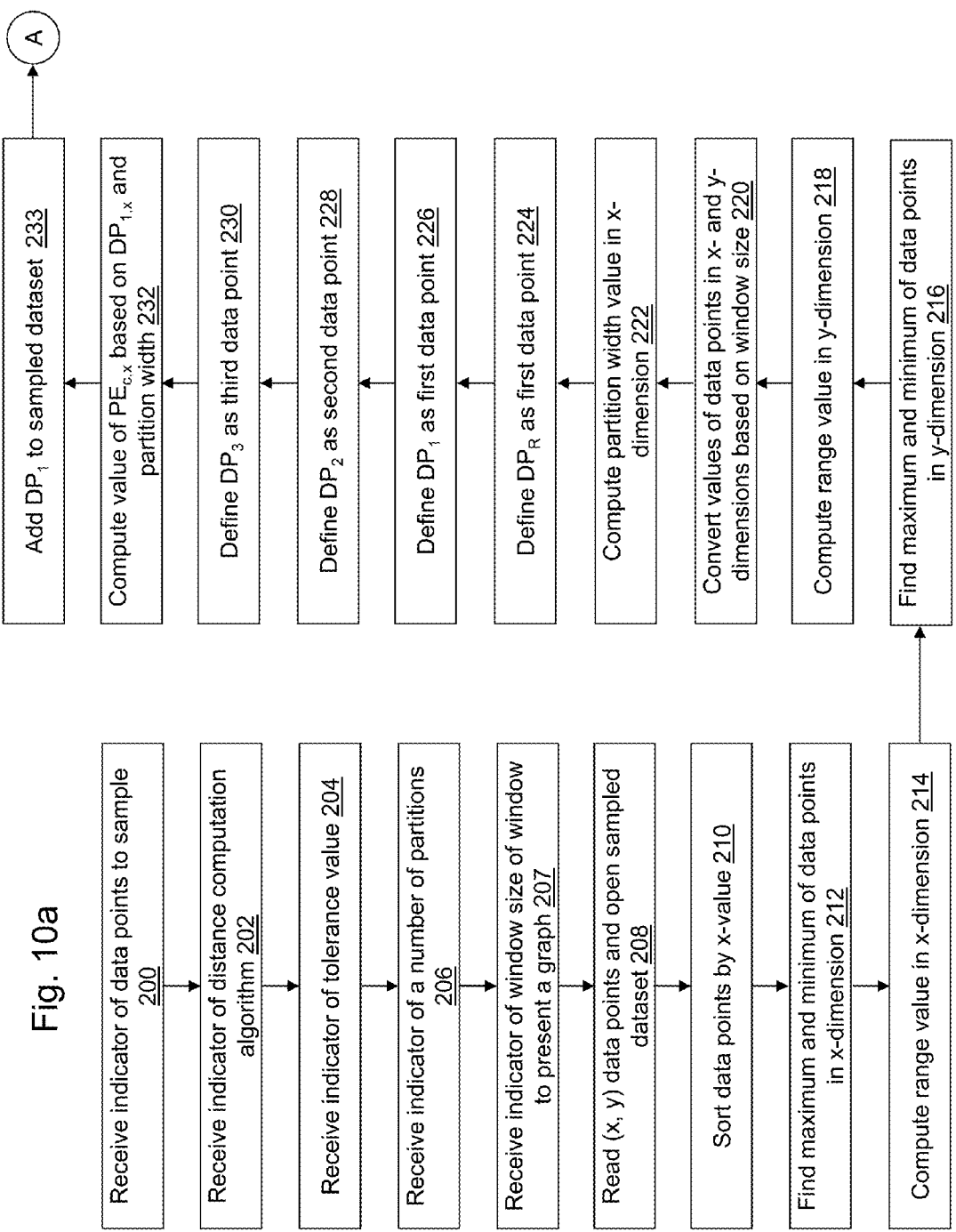
FIGS. 10a-10c depict flow diagrams illustrating examples of operations performed by the data point selection application of the data point selection device of FIG. 1 in accordance with another illustrative embodiment.
Figure 10B:
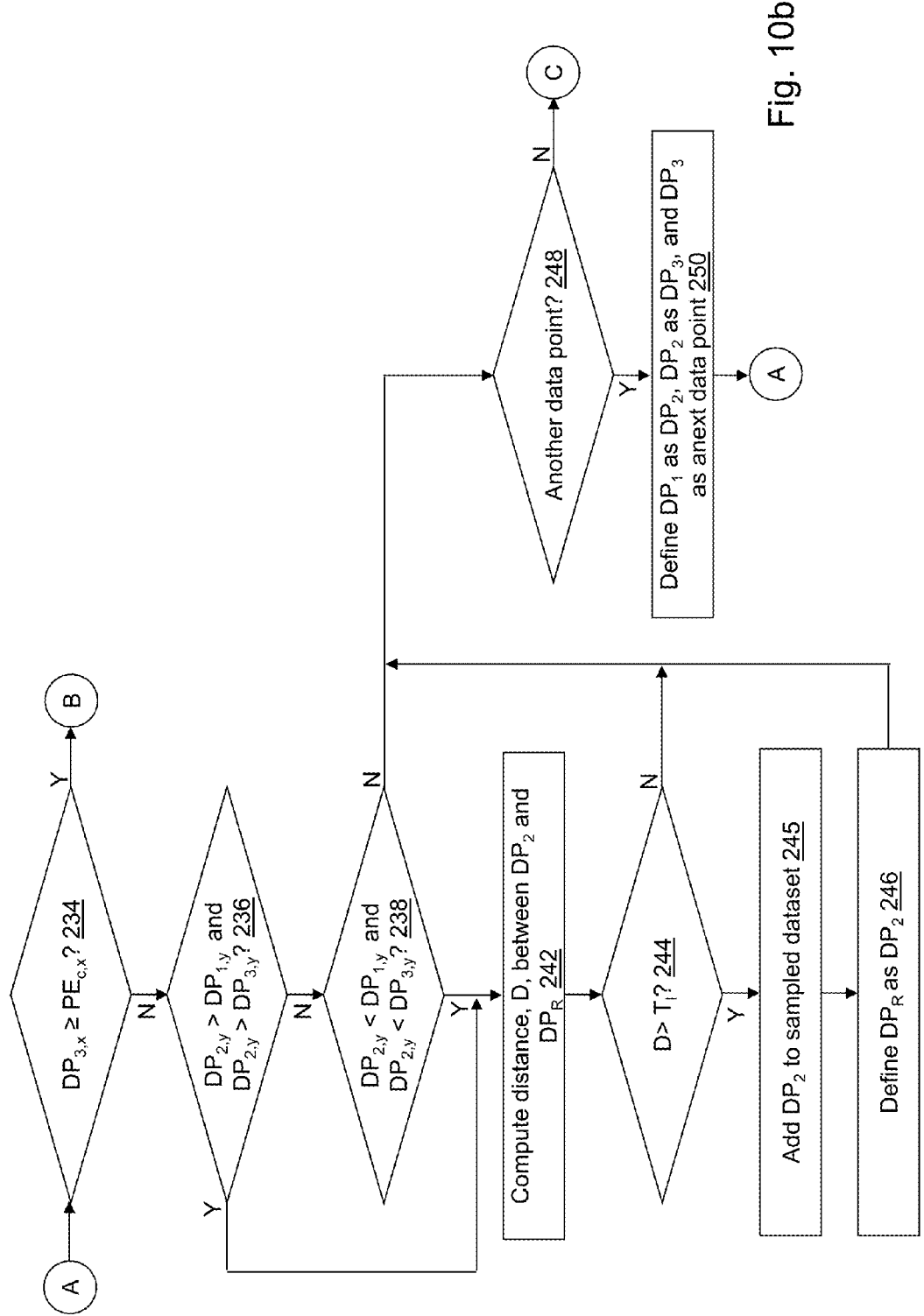
Figure 10C:
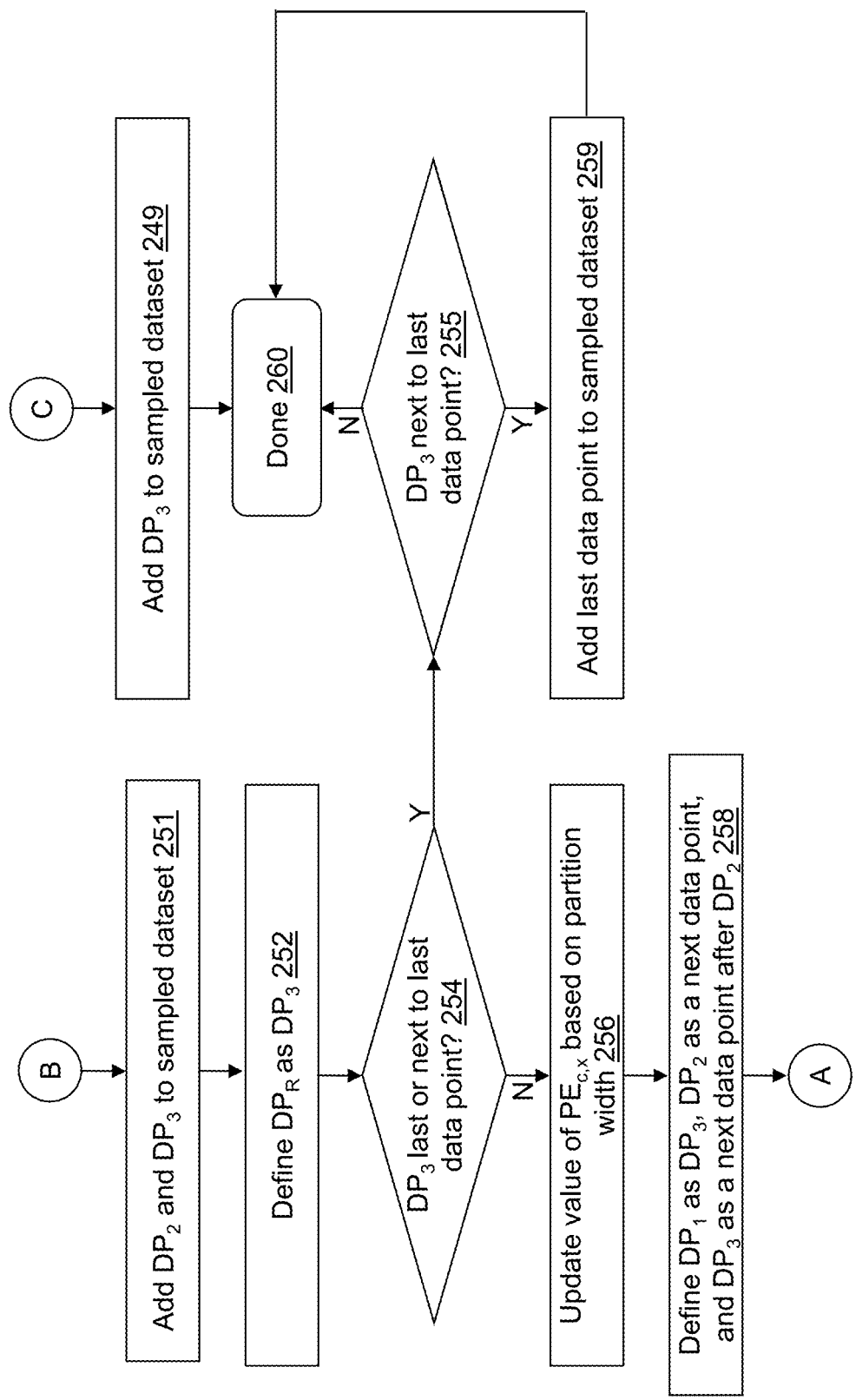

Referring to FIGS. 10a-10c, example operations associated with data point selection application 122 are described that are similar to the operations described with reference to FIGS. 2a-2c except that, instead of creating sampled dataset 126 as a copy of dataset 124 and processing sampled dataset 126 to delete data points, sampled dataset 126 is opened and data points from dataset 124 are processed to add data points to sampled dataset 126 whenever a data point was retained by the operations described with reference to FIGS. 2a-2c.

Referring to FIG. 10a, the operations are identical to the operations of FIG. 2a, except that an operation 233 is added after performing operation 232 and before performing operation 234, and operation 208 is modified. In operation 208, sampled dataset 126 is opened. In operation 233, the first data point $DP_1$ is added to sampled dataset 126.

Referring to FIG. 10b, the operations are identical to the operations of FIG. 2b, except that operation 240 is no longer included, and an operation 245 is added after performing operation 244 and before performing operation 246. In operation 245, $DP_2$ is added to sampled dataset 126.

Referring to FIG. 10c, the operations are identical to the operations of FIG. 2c, except that operations 249, 251, 255, and 259 have been added. Operation 249 is added after performing operation 248 and determining that there is not another data point and before performing operation 260. In operation 249, the last data point $DP_3$ is added to sampled dataset 126.

Operation 251 is added after performing operation 234 and determining that $DP_{3,x}$ is greater than or equal to $PE_{c,x}$ and before performing operation 252. In operation 251, $DP_2$ and $DP_3$ are added to sampled dataset 126.

Operation 255 is added after performing operation 254 and determining that $DP_3$ is the last or the next to last data point and before performing operation 260. In operation 255, a determination is made concerning whether or not $DP_3$ is the next to last data point in dataset 124. If $DP_3$ is the next to last data point, processing continues in operation 259. If $DP_3$ is not the next to last data point, processing continues in operation 260.

In operation 259, the last data point, which was not $DP_3$, is added to sampled dataset 126.

All of the data points in a dataset are not always crucial for the user. Many times, a user is interested in a trend in changes in the data rather than the entire dataset. Thus, it can be beneficial (in terms of performance) to sample the dataset such that the geometry of the sampled dataset is approximately the same as the original dataset. For example, preserving a shape of a curve provides the user with the desired information in terms of the increasing and decreasing trends, but improves a rendering time as graph rendering application 712 receives, processes, and renders fewer data points from data point selection application 122. Though there may be a sampling overhead, a reduced network latency and a reduced rendering time may lead to a net performance gain depending on the relative processing speed and network speed. The described techniques and systems use less computer memory, provide more efficient communications, and result in faster computer processing times than previous techniques.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a plurality of data points from a dataset, wherein each data point of the plurality of data points is defined in a first dimension and a second dimension, wherein the plurality of data points are sorted in the first dimension;

(a) define a first data point from the read plurality of data points, wherein the first data point has a first value ($V_{1y}$) defined in the second dimension;

(b) define a second data point from the read plurality of data points, wherein the second data point has a second value ($V_{2y}$) defined in the second dimension;

(c) define a third data point from the read plurality of data points, wherein the third data point has a third value ($V_{3y}$) defined in the second dimension;

(d) determine whether the second data point is a local minima or a local maxima, wherein the second data point is the local minima when $V_{2y} < V_{1y}$ and $V_{2y} < V_{3y}$, and wherein the second data point is the local maxima when $V_{2y} > V_{1y}$ and $V_{2y} > V_{3y}$;

(e) when the second data point is neither the local maxima nor the local minima based on the determination, delete the second data point from the read plurality of data points;

(f) define the first data point as the second data point and $V_{1y}=V_{2y}$;

(g) define the second data point as the third data point and $V_{2y}=V_{3y}$;

(h) define the third data point as a next data point from the read plurality of data points and $V_{3y}$ is equal to a value of the next data point defined in the second dimension;

(i) repeat (d)-(h) until each of the read plurality of data points is defined as the third data point to define a plurality of sampled data points as remaining data points of the read plurality of data points;

store the defined plurality of sampled data points to the non-transitory computer-readable medium;

compute a first range value in the first dimension based on a minimum value in the first dimension and a maximum value in the first dimension;

compute a second range value in the second dimension based on a minimum value in the second dimension and a maximum value in the second dimension;

compute a first conversion value in the first dimension based on a first display window size in the first dimension, wherein the first conversion value is equal to (W/Range$_x$), where W is the first display window size, and Range$_x$ is the computed first range value;

compute a second conversion value in the second dimension based on a second display window size in the second dimension, wherein the second conversion value is equal to (H/Range$_y$), where H is the second display window size, and Range$_y$ is the computed second range value;

convert each first dimension value of the read plurality of data points to fit within the first display window size using the determined first conversion value;

convert each second dimension value of the read plurality of data points to fit within the second display window size using the determined second conversion value; and render a graph on a display with the converted first dimension value and the converted second dimension value.

2. The non-transitory computer-readable medium of claim 1, further comprising computer-readable instructions that, when executed by the computing device, cause the computing device to:

receive a request to sample the plurality of data points from the dataset from a second computing device before reading the plurality of data points from the dataset; and send the stored plurality of sampled data points to the second computing device.

3. The non-transitory computer-readable medium of claim 1, wherein the dataset is read from a second computing device.

4. The non-transitory computer-readable medium of claim 1, further comprising computer-readable instructions that, when executed by the computing device, cause the computing device, before (a), to:

create a number of threads executing on the computing device;

divide the read plurality of data points into data point subsets based on the number of threads; and associate each data point subset of the data point subsets with a different created thread, wherein (a)-(i) is performed by each created thread, wherein the read plurality of data points is the data point subset of the associated, different created thread.

5. The non-transitory computer-readable medium of claim 4, wherein the read plurality of data points is divided approximately equally.

6. The non-transitory computer-readable medium of claim 1, wherein each first dimension value is converted using (W/Range$_x$)*(Read$_x$−Min$_x$) and each second dimension value is converted using (H/Range$_y$)*(Read$_y$−Min$_y$), where Read$_x$ is a respective first dimension value, Min$_x$ is the minimum value in the first dimension, Read$_y$ is a respective second dimension value, and Min$_y$ is the minimum value in the second dimension.

7. The non-transitory computer-readable medium of claim 1, wherein the converting each first dimension value and the converting each second dimension value are performed after (i) on the defined plurality of sampled data points.

8. The non-transitory computer-readable medium of claim 1, wherein the converting each first dimension value and the converting each second dimension value is performed after (c) and before (d).

9. The non-transitory computer-readable medium of claim 1, further comprising computer-readable instructions that, when executed by the computing device, cause the computing device to receive the first display window size and the second display window size from a second computing device, wherein the graph is rendered on the display by the second computing device.

10. A non-transitory computer-readable medium having stored thereon computer-readable instructions that, when executed by a computing device, cause the computing device to:

read a plurality of data points from a dataset, wherein each data point of the plurality of data points is defined in a first dimension and a second dimension, wherein the plurality of data points are sorted in the first dimension;

(a) define a first data point from the read plurality of data points, wherein the first data point has a first value ($V_{1y}$) defined in the second dimension;

(b) define a second data point from the read plurality of data points, wherein the second data point has a second value ($V_{2y}$) defined in the second dimension;

(c) define a third data point from the read plurality of data points, wherein the third data point has a third value ($V_{3y}$) defined in the second dimension;

(d) compute a partition end value as a sum of a first value defined in the first dimension of the defined first data point and a partition width value in the first dimension;

(e) compare a second value defined in the first dimension of the defined third data point to the computed partition end value;

(f) when the second value defined in the first dimension is less than the computed partition end value, determine whether the second data point is a local minima or a local maxima, wherein the second data point is the local minima when $V_{2y}<V_{1y}$ and $V_{2y}<V_{3y}$, and wherein the second data point is the local maxima when $V_{2y}>V_{1y}$ and $V_{2y}>V_{3y}$;

when the second data point is neither the local maxima nor the local minima based on the determination, delete the second data point from the read plurality of data points;

define the first data point as the second data point and $V_{1y}=V_{2y}$;

define the second data point as the third data point and $V_{2y}=V_{3y}$;

define the third data point as a next data point from the read plurality of data points and $V_{3y}$ is equal to a value of the next data point defined in the second dimension;
(g) when the second value defined in the first dimension is greater than or equal to the computed partition end value,
update the computed partition end value by adding the partition width value in the first dimension;
define the first data point as the third data point and $V_{1y}=V_{3y}$;
define the second data point as a data point after the third data point from the read plurality of data points when the third data point is not a last data point of the read plurality of data points and $V_{2y}$ is equal to a value of the data point after the third data point defined in the second dimension;
define the third data point as a next data point relative to the data point after the third data point from the read plurality of data points when the data point after the third data point is not the last data point of the read plurality of data points and $V_{3y}$ is equal to a value of the next data point relative to the data point after the third data point defined in the second dimension;
repeat (d)-(g) until each of the read plurality of data points is defined as the third data point to define a plurality of sampled data points as remaining data points of the read plurality of data points; and
store the defined plurality of sampled data points to the non-transitory computer-readable medium for rendering a graph with the stored plurality of sampled data points.

11. The non-transitory computer-readable medium of claim 10, further comprising computer-readable instructions that, when executed by the computing device, cause the computing device, before (d), to:
determine a first range value in the first dimension based on a minimum value in the first dimension and a maximum value in the first dimension; and
compute the partition width value by dividing the determined first range value by a number of partitions.

12. The non-transitory computer-readable medium of claim 11, further comprising computer-readable instructions that, when executed by the computing device, cause the computing device to determine the minimum value in the first dimension and the maximum value in the first dimension from the read plurality of data points.

13. The non-transitory computer-readable medium of claim 11, further comprising computer-readable instructions that, when executed by the computing device, cause the computing device to receive the number of partitions from a second computing device.

14. The non-transitory computer-readable medium of claim 10, further comprising computer-readable instructions that, when executed by the computing device, cause the computing device, before (d), to:
compute the partition width value by dividing a first display window size by a number of partitions.

15. A non-transitory computer-readable medium having stored thereon computer-readable instructions that, when executed by a computing device, cause the computing device to:
read a plurality of data points from a dataset, wherein each data point of the plurality of data points is defined in a first dimension and second dimension, wherein the plurality of data points are sorted in the first dimension;
(a) define a first data point from the read plurality of data points, wherein the first data point has a first value ($V_{1y}$) defined in the second dimension;
(b) define a second data point from the read plurality of data points, wherein the second data point has a second value ($V_{2y}$) defined in the second dimension;
(c) define a third data point from the read plurality of data points, wherein the third data point has a third value ($V_{3y}$) defined in the second dimension;
(d) define a previous retained point as the defined first data point;
(e) determine whether the second data point is a local minima or a local maxima, wherein the second data point is the local minima when $V_{2y}<V_{1y}$ and $V_{2y}<V_{3y}$, and wherein the second data point is the local maxima when $V_{2y}>V_{1y}$ and $V_{2y}>V_{3y}$;
(f) when the second data point is neither the local maxima nor the local minima based on the determination, delete the second data point from the read plurality of data points;
(g) when the second data point is the local maxima or the local minima based on the determination,
compute a distance between the defined second data point and the defined previous retained point;
compare the computed distance to a tolerance value;
when the computed distance is less than the tolerance value, delete the second data point from the read plurality of data points; and
when the computed distance is greater than the tolerance value, define the defined previous retained point as the defined second data point;
(h) define the first data point as the second data point and $V_{1y}=V_{2y}$;
(i) define the second data point as the third data point and $V_{2y}=V_{3y}$;
(j) define the third data point as a next data point from the read plurality of data points and $V_{3y}$ is equal to a value of the next data point defined in the second dimension;
repeat (e)-(j) until each of the read plurality of data points is defined as the third data point to define a plurality of sampled data points as remaining data points of the read plurality of data points; and
store the defined plurality of sampled data points to the non-transitory computer-readable medium for rendering a graph with the stored plurality of sampled data points.

16. The non-transitory computer-readable medium of claim 15, further comprising computer-readable instructions that, when executed by the computing device, cause the computing device to receive the tolerance value from a second computing device.

17. The non-transitory computer-readable medium of claim 15, wherein the distance is computed using a Euclidian distance computation algorithm.

18. A computing device comprising:
a processor; and
a non-transitory computer-readable medium operably coupled to the processor, the computer-readable medium having computer-readable instructions stored thereon that, when executed by the processor, cause the computing device to
read a plurality of data points from a dataset, wherein each data point of the plurality of data points is defined in a first dimension and a second dimension, wherein the plurality of data points are sorted in the first dimension;

(a) define a first data point from the read plurality of data points, wherein the first data point has a first value ($V_{1y}$) defined in the second dimension;
(b) define a second data point from the read plurality of data points, wherein the second data point has a second value ($V_{2y}$) defined in the second dimension;
(c) define a third data point from the read plurality of data points, wherein the third data point has a third value ($V_{3y}$) defined in the second dimension;
(d) define a previous retained point as the defined first data point;
(e) determine whether the second data point is a local minima or a local maxima, wherein the second data point is the local minima when $V_{2y}<V_{1y}$ and $V_{2y}<V_{3y}$, and wherein the second data point is the local maxima when $V_{2y}>V_{1y}$ and $V_{2y}>V_{3y}$;
(f) when the second data point is neither the local maxima nor the local minima based on the determination, delete the second data point from the read plurality of data points;
(g) when the second data point is the local maxima or the local minima based on the determination,
compute a distance between the defined second data point and the defined previous retained point;
compare the computed distance to a tolerance value;
when the computed distance is less than the tolerance value, delete the second data point from the read plurality of data points; and
when the computed distance is greater than the tolerance value, define the defined previous retained point as the defined second data point;
(h) define the first data point as the second data point and $V_{1y}=V_{2y}$;
(i) define the second data point as the third data point and $V_{2y}=V_{3y}$;
(j) define the third data point as a next data point from the read plurality of data points and $V_{3y}$ is equal to a value of the next data point defined in the second dimension;
(k) repeat (a)-(j) until each of the read plurality of data points is defined as the third data point to define a plurality of sampled data points as remaining data points of the read plurality of data points; and
store the defined plurality of sampled data points to the non-transitory computer-readable medium for rendering a graph with the stored plurality of sampled data points.

19. The computing device of claim 18, further comprising computer-readable instructions that, when executed by the computing device, cause the computing device to receive the tolerance value from a second computing device.

20. The computing device of claim 18, wherein the distance is computed using a Euclidian distance computation algorithm.

21. The computing device of claim 18, further comprising computer-readable instructions that, when executed by the computing device, cause the computing device to:
receive a request to sample the plurality of data points from the dataset from a second computing device before reading the plurality of data points from the dataset; and
send the stored plurality of sampled data points to the second computing device.

22. The computing device of claim 18, wherein the dataset is read from a second computing device.

23. The computing device of claim 18, further comprising computer-readable instructions that, when executed by the computing device, cause the computing device, before (a), to:
create a number of threads executing on the computing device;
divide the read plurality of data points into data point subsets based on the number of threads; and
associate each data point subset of the data point subsets with a different created thread,
wherein (a)-(k) is performed by each created thread, wherein the read plurality of data points is the data point subset of the associated, different created thread.

24. A method of sampling data, the method comprising:
reading, by a computing device, a plurality of data points from a dataset, wherein each data point of the plurality of data points is defined in a first dimension and a second dimension, wherein the plurality of data points are sorted in the first dimension;
(a) defining, by the computing device, a first data point from the read plurality of data points, wherein the first data point has a first value ($V_{1y}$) defined in the second dimension;
(b) defining, by the computing device, a second data point from the read plurality of data points, wherein the second data point has a second value ($V_{2y}$) defined in the second dimension;
(c) defining, by the computing device, a third data point from the read plurality of data points, wherein the third data point has a third value ($V_{3y}$) defined in the second dimension;
(d) defining, by the computing device, a previous retained point as the defined first data point;
(e) determining, by the computing device, whether the second data point is a local minima or a local maxima, wherein the second data point is the local minima when $V_{2y}<V_{1y}$ and $V_{2y}<V_{3y}$, and wherein the second data point is the local maxima when $V_{2y}>V_{1y}$ and $V_{2y}>V_{3y}$;
(f) when the second data point is neither the local maxima nor the local minima based on the determination, deleting, by the computing device, the second data point from the read plurality of data points;
(g) when the second data point is the local maxima or the local minima based on the determination,
computing, by the computing device, a distance between the defined second data point and the defined previous retained point;
comparing, by the computing device, the computed distance to a tolerance value;
when the computed distance is less than the tolerance value, deleting, by the computing device, the second data point from the read plurality of data points; and
when the computed distance is greater than the tolerance value, defining, by the computing device, the defined previous retained point as the defined second data point;
(h) defining, by the computing device, the first data point as the second data point and $V_{1y}=V_{2y}$;
(i) defining, by the computing device, the second data point as the third data point and $V_{2y}=V_{3y}$;
(j) defining, by the computing device, the third data point as a next data point from the read plurality of data points and $V_{3y}$ is equal to a value of the next data point defined in the second dimension;
(k) repeating, by the computing device, (a)-(j) until each of the read plurality of data points is defined as the third data point to define a plurality of sampled data points as remaining data points of the read plurality of data points; and storing, by the computing device, the defined plurality of sampled data points to a non-transitory computer-readable medium for rendering a graph with the stored plurality of sampled data points.

25. The method of claim 24, wherein the tolerance value is received from a second computing device.

26. The method of claim 24, wherein the distance is computed using a Euclidian distance computation algorithm.

27. The method of claim 24, further comprising:

receiving a request to sample the plurality of data points from the dataset from a second computing device before reading the plurality of data points from the dataset; and sending the stored plurality of sampled data points to the second computing device.

28. The method of claim 24, wherein the dataset is read from a second computing device.

29. The method of claim 24, further comprising, before (a):

creating, by the computing device, a number of threads executing on the computing device;

dividing, by the computing device, the read plurality of data points into data point subsets based on the number of threads; and associating, by the computing device, each data point subset of the data point subsets with a different created thread, wherein (a)-(k) is performed by each created thread, wherein the read plurality of data points is the data point subset of the associated, different created thread.

* * * * *